United States Patent [19]

Steele et al.

[11] Patent Number: 5,169,342
[45] Date of Patent: Dec. 8, 1992

[54] METHOD OF COMMUNICATING WITH A LANGUAGE DEFICIENT PATIENT

[76] Inventors: Richard D. Steele, 2926 South Ct., Palo Alto, Calif. 94306; Michael Weinrich, 220 Northway, Baltimore, Md. 21218; Young Harvill, 1784 Hamlet St., San Mateo, Calif. 94403; Maria K. Kleczewska, 4232 23rd St., San Francisco, Calif. 94114

[21] Appl. No.: 530,735

[22] Filed: May 30, 1990

[51] Int. Cl.$^5$ ............................................. G09B 21/00
[52] U.S. Cl. .................................... 434/112; 434/118; 434/169; 434/307; 340/709; 273/454; 273/DIG. 28; 341/28; 395/159
[58] Field of Search ............... 434/112, 118, 167, 169, 434/307, 429; 340/712, 721, 825.19, 709; 364/518, 521, 200 MS File, 900 MS File; 273/1 E, DIG. 28, 434, 437, 440, 454; 341/21, 22, 28

[56] References Cited

U.S. PATENT DOCUMENTS

| | | | |
|---|---|---|---|
| 4,109,145 | 8/1978 | Graf | 340/721 X |
| 4,559,598 | 12/1985 | Goldwasser et al. | 434/169 X |
| 4,656,603 | 4/1987 | Dunn | 364/521 X |
| 4,823,303 | 4/1989 | Terasawa | 364/521 |
| 4,868,766 | 9/1989 | Oosterholt | 364/521 X |

OTHER PUBLICATIONS

Richard D. Steel, et al. "Computer-Based Visual Communication In Aphasia", Neuropsychology, vol. 00, No. 0, pp. 000–000, 1988.
Richard D. Steele, et al., "Evaluating Performance Of Severely Aphasic Patients On A Computer-Aided Visual Communication System".
Michael Weinrich, et al. "Representations of 'Verbs' In A Computerized Visual Communication System", Aphasiology, 1989; vol. 2.
Michael Weinrich, et al. "Processing Of Visual Syntax In A Globally Aphasic Patient" Brain And Language 1989.

Primary Examiner—Richard J. Apley
Assistant Examiner—Joe H. Cheng
Attorney, Agent, or Firm—Limbach & Limbach

[57] ABSTRACT

An interactive method of communicating with a language deficient user such as an aphasic patient is disclosed. The computer has a display with a pointing device for visually indicating a position through a cursor means on the display. In one example, a plurality of images with each image being a graphical representation of word oriented information or a component thereof is displayed. A plurality of tool-like icons is also displayed. The cursor can be positioned to one of the desired plurality of tool-like icons. When one of the plurality of tool-like icons is selected by the user, the cursor is changed into the image of the tool-like icon selected. The tool-like icon image selected for the cursor is then moved to one of a plurality of the images which represent word-oriented information or a component thereof. When the cursor is activated on the image, a display of information represented by the tool-like icon acting on the word-oriented image is then visually displayed by the computer.

16 Claims, 33 Drawing Sheets

Microfiche Appendix Included
(138 Microfiche, 2 Pages)

Step 1.

Step 2.

Step 3.

Step 4.

Step 1.

Step 2.

Step 3.

Step 4.

Step 1.

Step 2.

Step 3.

Step 1.  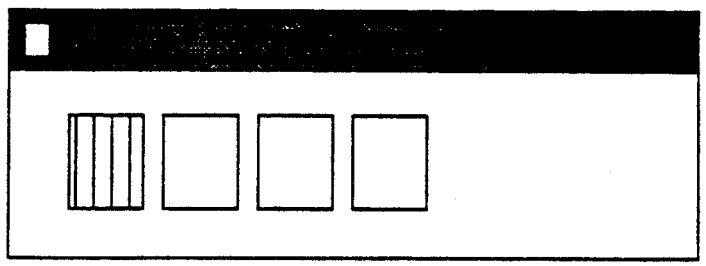
FIG. 5a
Step 2.  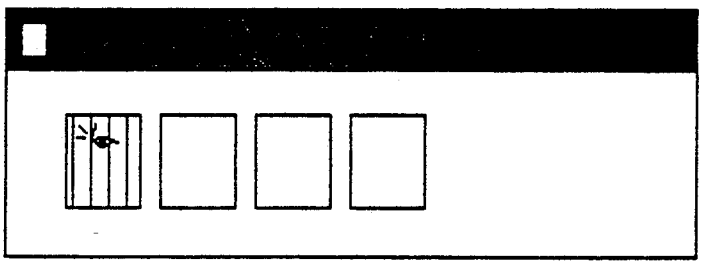
FIG. 5b
Step 3.  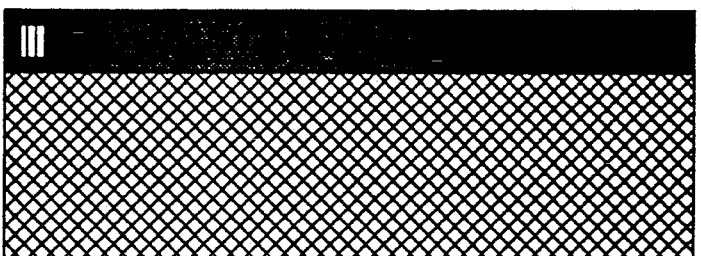
FIG. 5c Step 1.

Step 2.

Step 3.

Step 1.

Step 2. (e.g., "to drip")

Step 3.

Step 1.

Step 2.

Step 3.

Step 1.

Step 2.

Step 3.

Step 1.

Step 2.

Step 3.

Step 1.

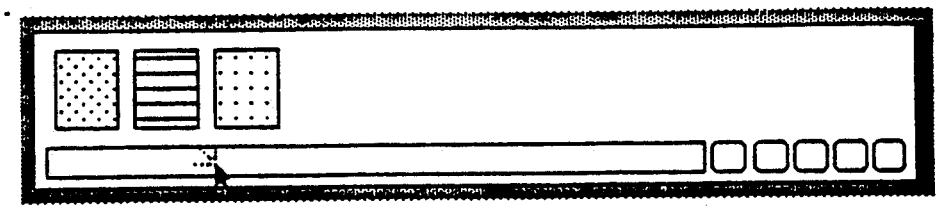

e.g. [MAN] [DRINK] [TEA]
noun verb noun
human trans/ liquid
male intrans ingestible
etc. etc. etc.

FIG. 12a

Step 2. Input: → Parser: → Output: tree-structured parse left-to-right string, e.g.:

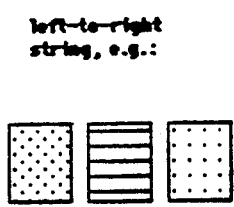

assigns underlying language-like structure using pre-programmed syntactic rules:

e.g.,
Sentence —>
 Noun-phrase
 + Verb-phrase

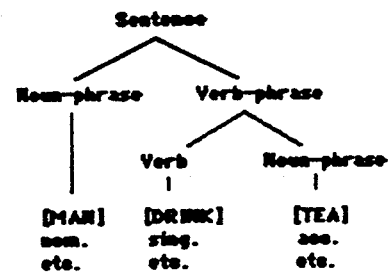

FIG. 12b

Step 3. Input: → Translator: → Output:
Tree-Structured contains language-specific translation
Parse from Step 2 lexicon and grammatical into a
above rules, e.g., [MAN] = man, Mann, specified
 homme, mężczyzna, etc. language

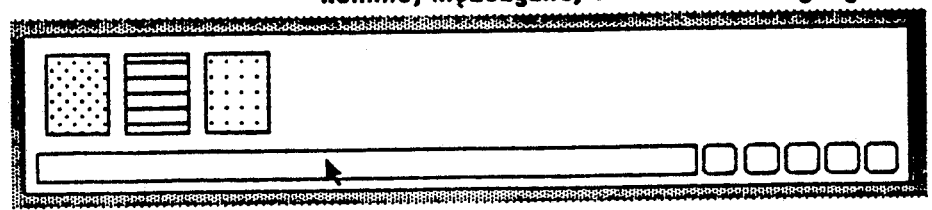

(Or equivalent in other natural languages: e.g., Polish: Mężczyzna pije herbatę.)

FIG. 12c

METHOD OF COMMUNICATING WITH A LANGUAGE DEFICIENT PATIENT

This application is submitted with a microfiche Appendix (Exhibit A), consisting of two (2) microfiches and 138 frames, the copyright of which is retained by the owner. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to a method of communicating with a language deficient user, and more particularly, with an aphasic user. However, as will be shown, hereinafter, the present invention can also be used to facilitate communication with: 1) a normal user who is conversant in a different language; 2) a normal person who is in the process of acquiring language(s); and 3) a person with communication difficulties deriving from speech impairments.

BACKGROUND OF THE INVENTION

Aphasic patients are patients who have lost the ability to understand and produce language due to brain damage. Aphasia can be produced, for example, by stroke. In chronic severely aphasic patients, the patient is permanently unable to read, write, speak or understand spoken communications. In addition, the aphasic patient is unable to learn to use a keyboard or other language based techniques, such as sign language, to communicate. Thus, existing methods to communicate with severely aphasic patients have proven to be profoundly limited.

In the prior art, it was recognized that severely aphasic patients could utilize a computer generating an icon-based language-oriented alternative communication system. These prior art methods have relied upon the basic principle of flash cards, utilizing the power of a microcomputer to implement them. Thus, see for example, "Computer-Based Visual Communication in Aphasia" by Richard D. Steele, Michael Weinrich, Robert T. Wertz, Maria K. Kleczewska, and Gloria S. Carlson, in *Neuropsychologia*, vol. 27, pages 409-426 (1989). In that article, a C-VIC system for Computer-aided Visual Communication was reported.

The prior art computer-based visual communication system was based upon a flash card system transposed on to the computer screen incorporating automatic organization and a limited hierarchical access scheme. In that system, symbol creation and editing were extremely limited as scenes, animation and contextual cueing functions were unavailable. There was no pre-programing or interactive explanatory feedback. The flash cards were basically unchanging objects that were only transposed and re-arranged, always being of standard size and shape and were essentially inert in behavior.

Other prior art has included: "Evaluating Performance of Severely Aphasic Patients on a Computer-Aided Visual Communication System" by Richard D. Steele, Michael Weinrich, Maria K. Kleczewska, Gloria S. Carlson and Robert T. Wertz, in *Clinical Aphasiology*, BRK Publishers, Minneapolis, MN (1987); "Processing of Visual Syntax in a Globally Aphasic Patient" by Michael Weinrich, Richard D. Steele, Gloria S. Carlson, Maria K. Kleczewska, Robert T. Wertz and Errol Baker, in *Brain and Language*, vol. 36, pages 391-405 (1989); "Representations of 'Verbs' in a Computerized Visual Communication System" by Michael Weinrich, Richard D. Steele, Maria K. Kleczewska, Gloria S. Carlson, Errol Baker and Robert T. Wertz, in *Aphasiology*, 1989, vol. 3, pages 501-512 (1989).

SUMMARY OF THE INVENTION

In the present invention a method of graphically communicating language-oriented information to and from a user by the use of a computer with a display having a pointing device for visually indicating a position through a cursor means on a display is disclosed. Although a number of specific methods are disclosed, they all form an icon-based language-oriented system and the manipulation and operation of the icon-based language-oriented system.

BRIEF DESCRIPTION OF THE DRAWINGS

FIGS. (1-12c) are schematic diagrams illustrating the various screens in simplified format, showing the functions of the programs as described in the flow chart of Exhibit B.

DETAILED DESCRIPTION OF THE INVENTION

The present invention relates to a method of graphically communicating language-oriented information to and from a user. Some of the embodiments of the methods described hereinafter have particular application to aphasic or language deficient users. Thus, as used herein, the term "aphasic" includes all language deficient or written and spoken communication disadvantaged users. In the preferred embodiment, the method of the present invention is practiced by using an Apple Corporation's Macintosh Plus computer executing a program, a copy of the source code listing of which is attached herewith as Exhibit A. The icons generated thereby were all made from the Apple Tool kit. The program attached in Exhibit A was created in the Forth language.

As used herein, the term "language-oriented" means operations by a user who is not assumed to have fully functional language capability. It consists of a visual representation of language units and other supporting information which supports the visual representation.

From the user's perspective, the operation of the computer program as set forth in Exhibit A is best explained by the flow chart, set forth on FIGS. 14(a-l). The reference to a function # refers to the number shown on FIG. 14. In the operation of the computer program, the computer program must first be loaded into the Macintosh computer which has a display and also a pointing device such a "mouse". The pointing device creates a cursor display on the screen of the output display device. The program is commenced by "double-clicking" on the mouse while the cursor is on a program icon to initiate the program.

After the program is commenced or is launched, a user is presented on the display device with an initial program screen, which is divided into an upper "lexical access" area, and a lower "phrase construction" area. The upper "lexical access" area contains a rectangular "Access Window" and three "cursor tools" available for selection arranged vertically in the upper left part of the screen. In the computer terms, a window is a separate display overlaying a specified portion of the display device. In the lower "phrase construction" portion of the screen display are two narrow rectangular "Phrase Windows" labeled "Phrase 1" and "Phrase 2". A phrase construction window is a window in the display where the user can construct phrases for the communication session. In general, constructing a phrase for communication requires the user iteratively to employ an appropriate cursor tool to interact with the "Access Window" to move to the desired icon, activating the icon, and then dragging that icon from the "Access Window" into one of the "Phrase Windows", where the dragged icon can be rearranged with the icons existing in that window, if any.

Figure 1:
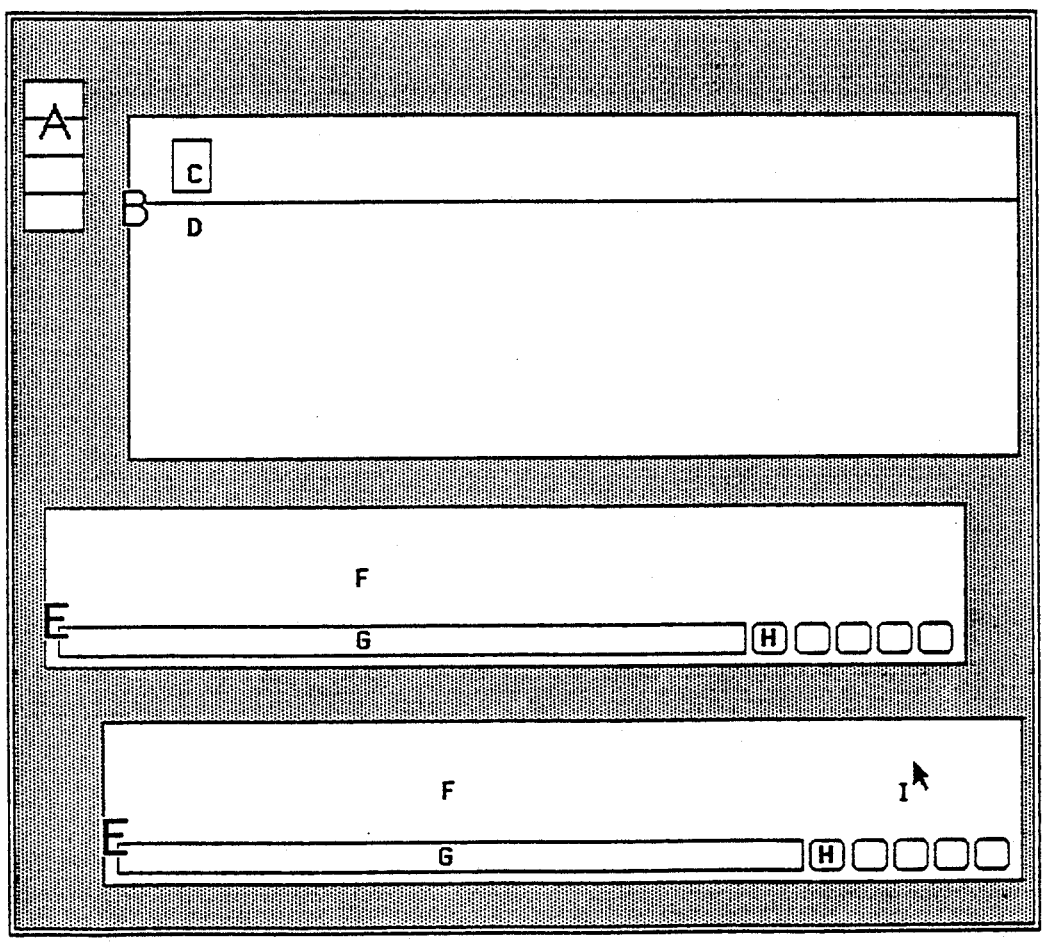
Figure 2A:
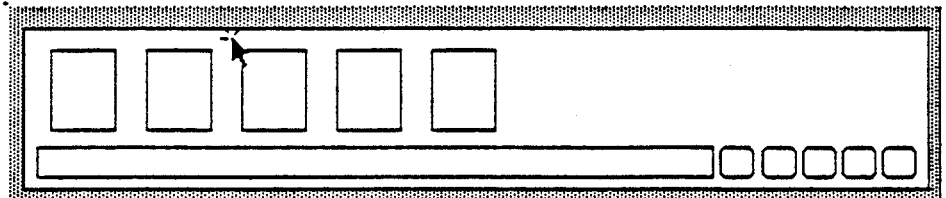
Figure 2B:
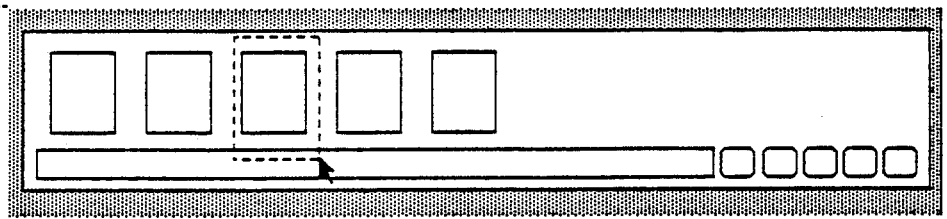
Figure 2C:
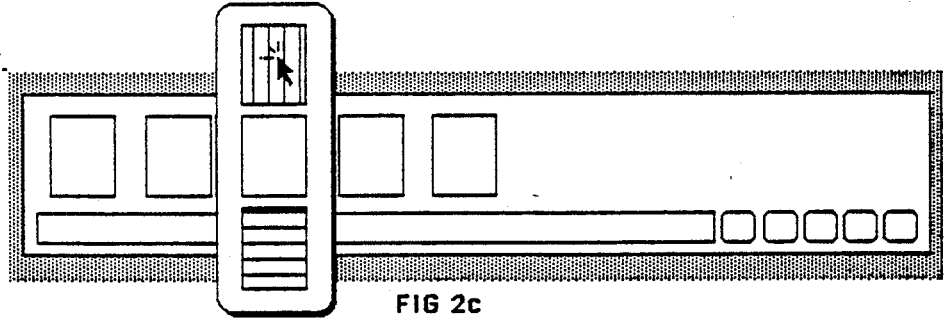
Figure 2D:
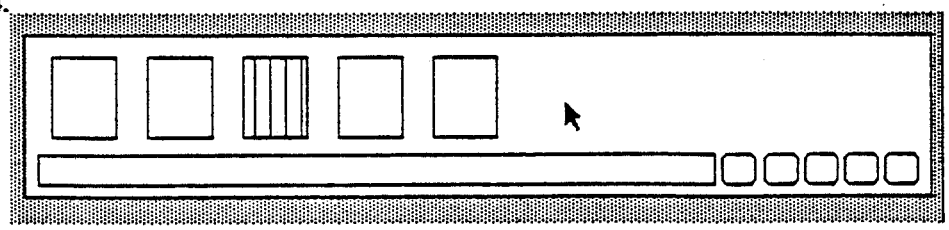
Figure 3A:
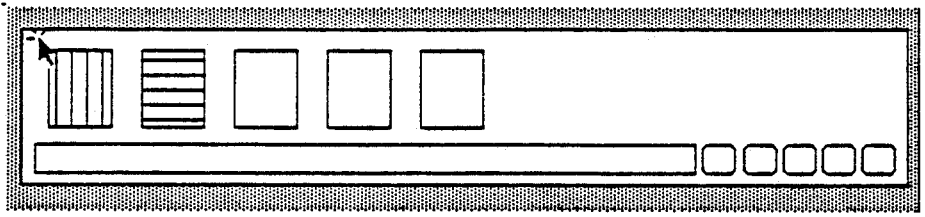
Figure 3B:
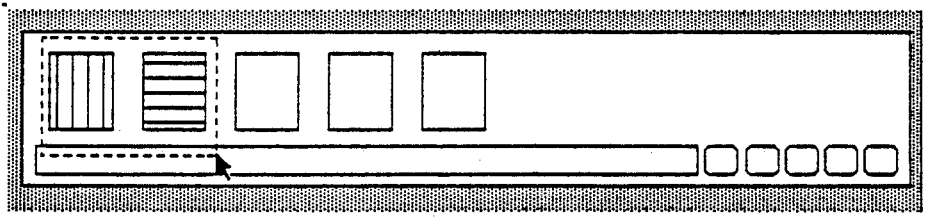
Figure 3C:
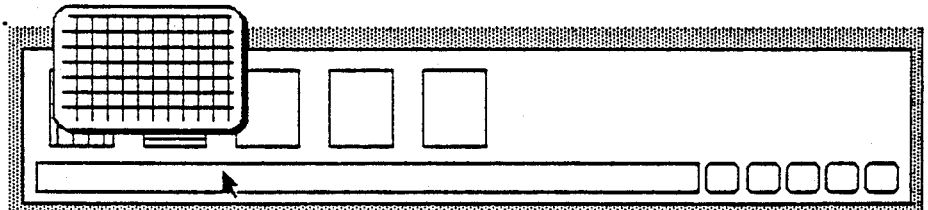
Figure 3D:
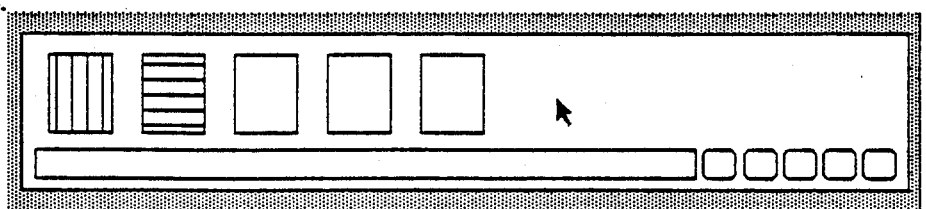

FIG. 1 is a screen display showing A a window containing various cursor tools which may be selected; B a window called the Access Window, where various icons may be access by activating the cursor tools on the icons displayed in the Access Window; C a window which displays the node directly above the current display in the Access Window; D the access space of the Access Window where icons are typically displayed and activated; E two Phrase Windows, in which icons may be assembled and arranged in the upper portion labeled F; G a text area, in which the words associated with the icons are displayed, or where the inputted text is displayed; H a row of control buttons to activate text-graphics strings in the two Phrase Windows, in order for example to store them, retrieve them, have them spoken etc.; I a cursor tool (here in the shape of an arrow) which allows the user to interact with the items on the screen.

After the program is launched, the user may exercise any one of the options of Function 3 through Function 26 presented the FIGS. 14(a-l). Although the flow chart shown in FIGS. 14(a-l) describes a number of options which appear to be sequentially organized, the user can in fact proceed to any one of the options directly without going through the sequence.

(Function #3) One of the options which the user may exercise is to determine if the user wishes to access the displayed icon's paradigmatic alternatives.

As will be understood by those skilled in the art, language elements can be characterized along a syntactic axis and along a paradigmatic axis. Thus, for example, considering the sentence "Mary saw father" along the syntactic axis, the rules of syntax in the English language requires that the subject "Mary" must precede the verb "saw" which must precede the direct object "father". In the paradigmatic axis, the verb "saw" can be replaced by a number of choices of other verbs or verb forms (e.g. sees, loved, loves, etc.). Thus, syntactic rules specify what can follow, whereas paradigmatic rules specify what can replace.

When the user is given a choice to access the icon-paradigmatic alternatives, a sentence is first constructed which is appropriate for the communication session. For example, if the user were in a restaurant the appropriate information for the communication session in that environment might be "I want a nonsmoking table for two". The computer displays an icon-like image for each of the key words (e.g. ignoring articles) and displays those plurality of icon-like images on the display.

When the user chooses to access the icon's paradigmatic alternative, the user may replace a word related icon appropriate words in the displayed information with another which is appropriate for the communicative intent for that communication session. The user moves the cursor by the pointing device to a position which is adjacent to the top or to the bottom of one of the icon-like images. Thus, if the user wishes to change the word "nonsmoking", the user moves the cursor to a position adjacent to the symbol of nonsmoking, typically a cigarette with a circle surrounding it and a diagonal line across it. The user then activates the cursor, for example, by clicking on the mouse and while it is activated, and drags the cursor in a substantially vertical direction crossing the image representative of "nonsmoking" to the other side of the image representative of "nonsmoking".

After the user has dragged the cursor to create a vertical rectangle around the "nonsmoking" icon, the computer responds by opening a window in the display. The window is vertically oriented and is displayed to show the "nonsmoking" icon and a plurality of other possible replacement images all of them displayed in a vertical direction. The user can move the cursor to any one of the images displayed in the window. The user then selects and activates one of the images displayed in the window. The computer automatically then displays the selected image in the position that was previously occupied by the "nonsmoking" icon-like image. The window is then closed or caused to disappear from the screen. It is believed that the vertical display of images representative of words in the paradigmatic axis is best for understanding by aphasic or other users. Further, syntactic axis is best displayed in a horizontal direction.

Referring to FIG. 2, there is shown a schematic diagram of the paradigmatic function of the program. In many situations, specific words will have a high likelihood of being replaced by certain other words. The program allows the user to select an icon by enclosing the icon in a vertical direction (as shown in steps 1-2). The program responds by opening another window with the most likely and appropriate replacements (step 3). Clicking an icon in the opened window will cause the selected icon to replace the original icon (step 4).

(Function #4) If the user wishes to display information relating to the syntactic axis, then the user moves the pointing device to enclose two or more adjacent icons. As previously stated, the icons are positioned horizontally in the syntax axis. If the cursor encloses two more adjacent icons, then another "window" is opened visually illustrating the meaning of the icons enclosed, whenever relevant. Thereafter, the window disappears.

When the window is opened, the computer responds to the activation of the enclosure by combining the semantically appropriate icon-like images into a single unified icon-like image. For example, if an image of a noun is followed by an image of a verb, the computer displays a single unified icon-like image of the noun as the subject performing the action of the verb as a predicate.

The single unified icon-like image can be displayed on a facet of a rotatable solid geometric body. Where there are other options for the user, alternative images of the verb being acted upon by the image of a noun are displayed on other facets of the geometric body.

Alternatively, if the enclosed icons are an image of an adjective followed by an image of a noun, then the computer displays a single unified icon-like image with a control. The image has the quality depicted by the adjective which is adjustable by the user. Thus, if the user had selected the images of "small" and "cat", the single unified image would be of a cat whose size is being displayed on the display screen changes as the user adjusts the control associated with the "small +cat" combination.

Referring to FIG. 3, there is shown the combination of adjacent icons having their meaning displayed. The user selects two or more adjacent icons (e.g. "dog" and "walks"), by enclosing the two icons in a single "drag" (see steps 1-2). In response, the computer opens another window which shows an illustrative sense of the phrase formed by the elements enclosed in the drag (e.g. "dog walks" showing a dog walking) (see step 3). After the meaning is illustrated, the opened window is then closed, and the original string of icons is displayed on the screen.

(Function #5) After the syntactic axis, the user may view a phrase associated with an icon. In the event the user chooses this option, the user clicks the mouse with the cursor on the Phrase Viewing Tool which is displayed on the screen in a small window adjacent to the Access Window. The cursor itself takes on the image of the Phrase Viewing Tool. Thereafter, when the user moves the "cursor" the user is moving an image of the desired tool. The tool can then be placed on any of the images that is displayed and when the image of the tool is clicked while on top of the desired icon, the resultant activation of the image of the tool (which is the cursor) causes a display of the action communicated by the tool with specific reference to the word represented by the selected image.

Figure 4A:
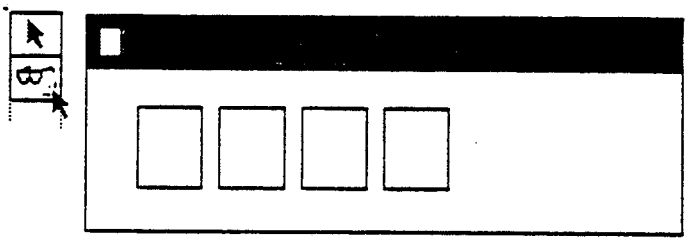
Figure 4B:
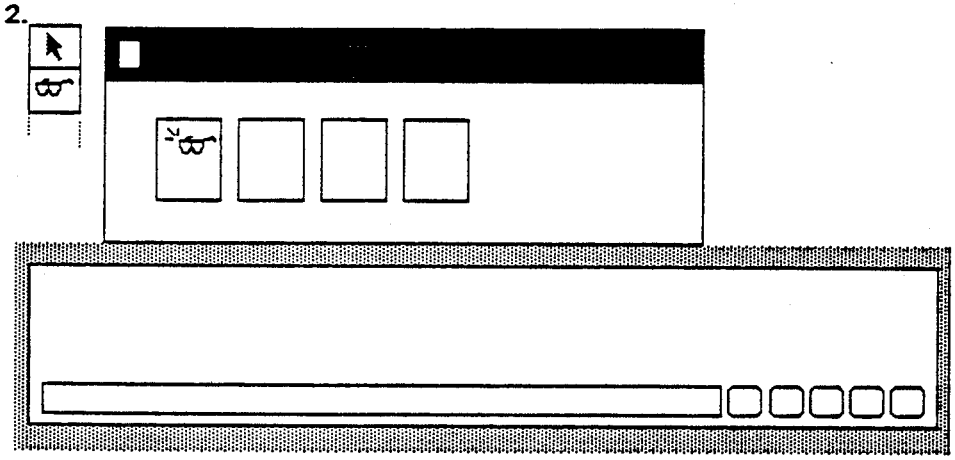
Figure 4C:
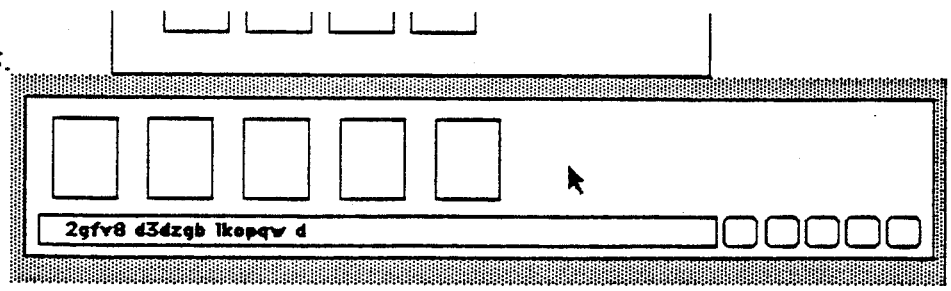

Referring to FIG. 4, the user selects the Phrase Viewing Tool (here shown as pair of eye glasses), from the cursor tool box, in the window in the upper left hand portion of the screen (step 1). When activated, the cursor takes the shape of the eye glass tool (step 2). The user then uses that tool to activate the desired icon (step 3). In response the computer displays a phrase in the Phrase Window which is associated with the Cursor Tool acting upon the icon. The cursor then returns to the default display of the arrow (step 3).

(Function #6) The user can also view a scene associated with an icon. In that event, the user clicks on the cursor on the Scene Viewing Tool. The image of the cursor then is transformed into the image of the Scene Viewing Tool. The image of the Scene Viewing Tool becomes the cursor and is placed on the desired selected image. The activation of the cursor or the Scene Viewing Tool prompts the computer to display the scene associated with the desired selected image to appear occupying that same window. Thus, the Scene Viewing Tool (cursor) acts upon the desired selected image to produce information represented by the selected image being seen in a communicatively supportive context.

Referring to FIG. 5 there is shown a scene associated with an icon. In this function, the user selects a Scene Viewing Tool from the cursor tool selection window (step 1). Upon selection, the cursor assumes the shape of the selected tool (step 2). The shaped tool is then activated over a desired icon, which causes a scene associated with that icon to appear in that display window (step 3). The cursor then returns to its original arrow shape.

(Function #7) The user can also display componential information. In a componential display, the image of the cursor becomes the image of the componential information tool. The appearance may be the outline of a solid body with several facets. The image of the tool is placed on top of a selected image. When activated, a display of the rotation outline of a solid body having a plurality of different types of information on the facets appearing thereon is rotated. Activation of the cursor causes the information associated with the forward most facet to be displayed. Then the original selected image reappears.

Figure 6A:
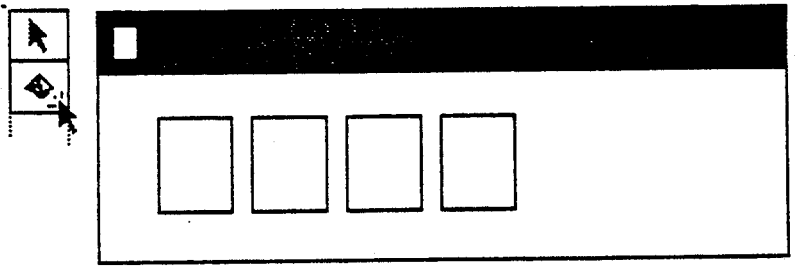
Figure 6B:
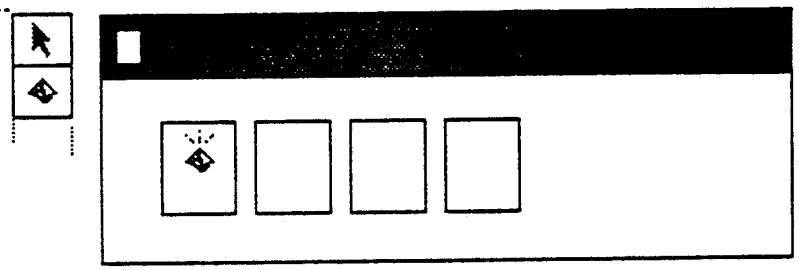
Figure 6C:
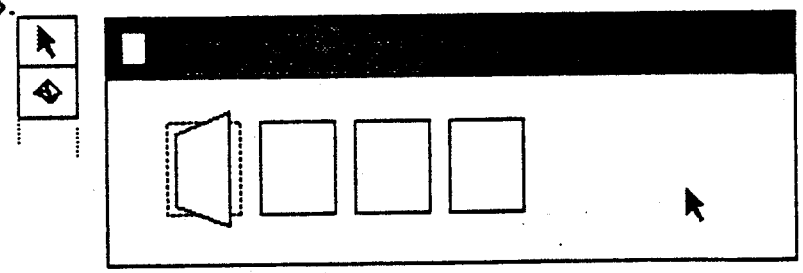

Referring to FIG. 6 there is shown an example of this function. An icon's componential information is ancillary information about some facet or feature of an item portrayed in an icon which can help some users understand the intended sense better (i.e. information on what sound an item produces, what color(s) it might be, what synonyms or near-synonyms it has, how it is spelled aloud etc.) The facet cursor tool provides access to such information. In step 1, the user clicks the mouse which activates the cursor, which is positioned on the facet tool. The cursor then takes the shape of the facet tool. In step 2, the user clicks the facet tool on the desired icon. The tool then causes a solid body outline to rotate to display the various facets of information (here, in the example, the body is shown as a two sided body). Clicking the mouse button stops the rotation, causing the forward most facet to display and then returns the icon to its original state as in step 1.

(Function #8) The user is also able to animate certain icons. Animation of an icon is achieved by moving the cursor to the position of the image of the desired icon. When the cursor is activated, the image of the icon then animates itself to illustrate its meaning. The icon imparts visual information about itself.

Thus, an icon representative of a noun word generally animates itself by displaying itself as an image mounted on a facet of a solid geometric body, rotated to display other possible images of nouns or other information.

In the case of a verb, the icon generally animates itself by depicting only of the action represented by the verb, without any other identifiable word associated with the verb. For example, the action of "stirring" is animated by an instrument (without sufficient visual detail to discern the type of instrument, e.g. fork or spoon), rotating in a vessel (again, without sufficient visual detail to discern the type of container, e.g. bowl, cup etc.).

In the case of an adjective, the animation is of an image of a noun ranged through a plurality of possible values, and then settling on an appropriate value depicted by the adjective.

In the case of a preposition, the animation is of the icon extending to the left and to the right to the other icon images signal the nouns which enter into the prepositional relationship. For example, in the phrase "flowers in vases", clicking the cursor on the "in" icon could cause a projection from the "container" element of the "in" icon to extend briefly to the further boundaries of the "vases" icon to the right, while a projection from the "contained" element of the icon "in" could extend briefly to the further boundaries of the "flowers" icon to the left.

In the case of a conjunction, the animation is of a display expanded to include neighboring icon-like images affected and visually denoting the nature of the intended relationship. Thus, for example, the conjunction "AND" may be depicted by the neighboring icons flashing in unison, whereas the conjunction "OR" may have the neighboring icons flashing alternately.

Figure 7A:
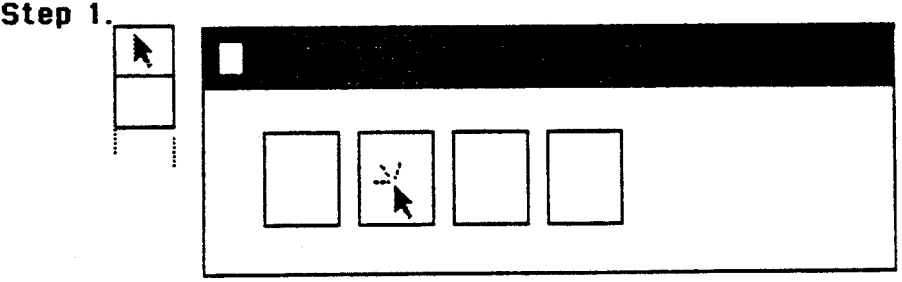
Figure 7B:
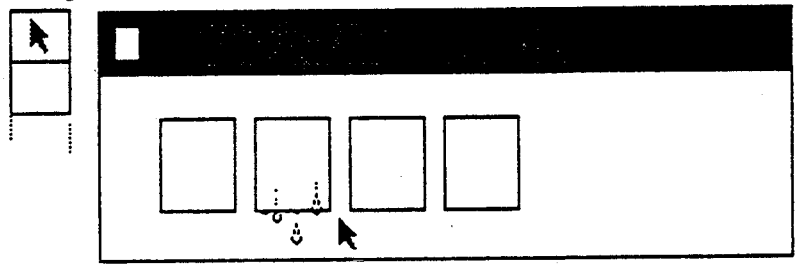
Figure 7C:
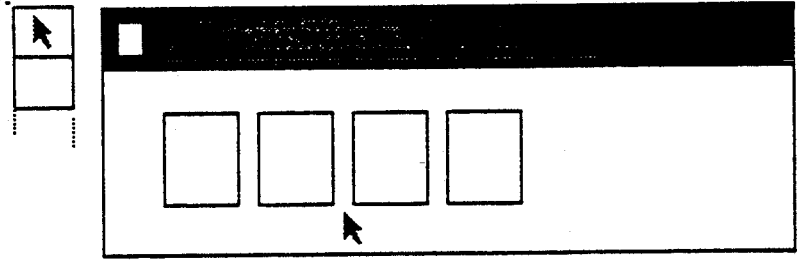

An example of this function can be seen by referring to FIG. 7. The user clicks the arrow cursor on an icon (step 1). In response, the icon animates itself (step 2). The minimum response is for an icon briefly to display a darker pattern in all its interior parts, in order to acknowledge the activation, and then to return to its original appearance. Longer and more informative animations illustrate intended meanings, as, for example, with the verbs "pour" and "spill", showing a liquid smoothly running out of the lip of a tilted vessel to illustrate the meaning of "to pour", while showing a liquid sloshing over the edges of an unsteady vessel to illustrate the meaning of "to spill". Following the animation, the screen returns to its initial appearance (step 3).

(Function #9) The user can also move the icon into a Phrase Window. In that event, the user activates the pointing device and drags a copy of the image from the access window. The access window is above the Phrase Window and is the location where various possible icons appropriate for the communication session are stored and displayed. The user selects the appropriate icon(s) from the access window and moves them to the Phrase Window to construct a phrase for the communication session. The "drag" process is ended when the mouse button is released when the image is placed in the desired position over the Phrase Window. The dragged icon image is inserted between whatever icons lie beneath where the drag has ended or else is placed in the right-most position of the current phrase being constructed.

Figure 8A:
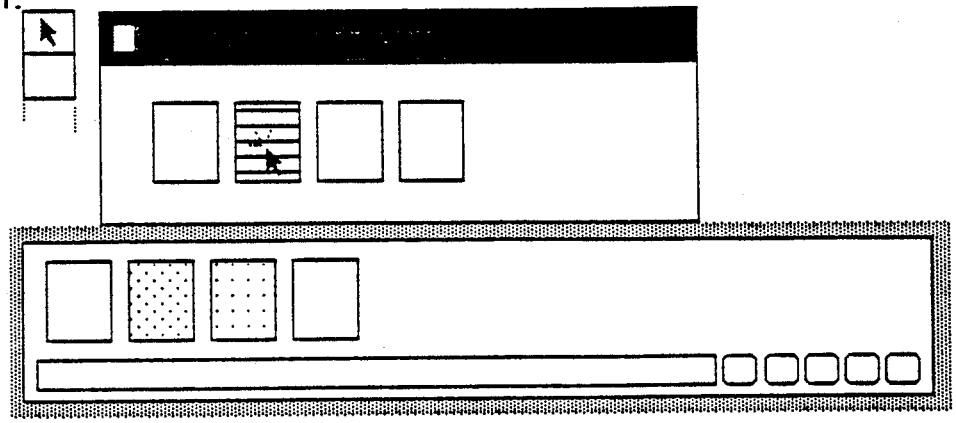
Figure 8B:
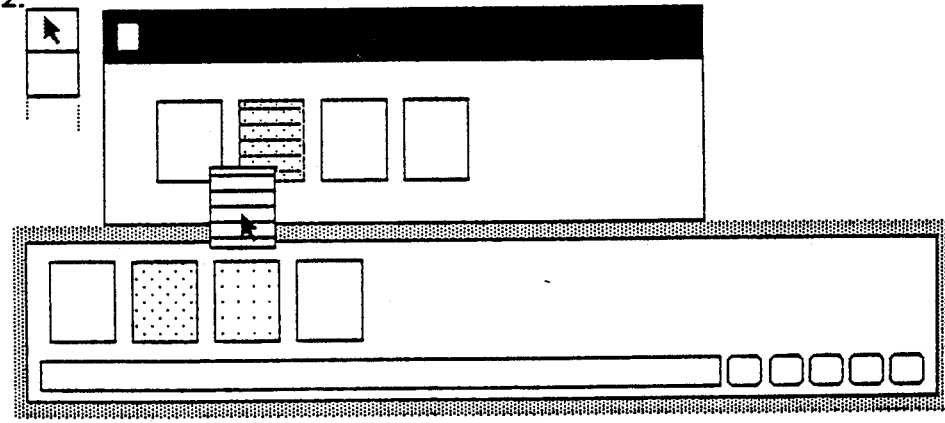
Figure 8C:
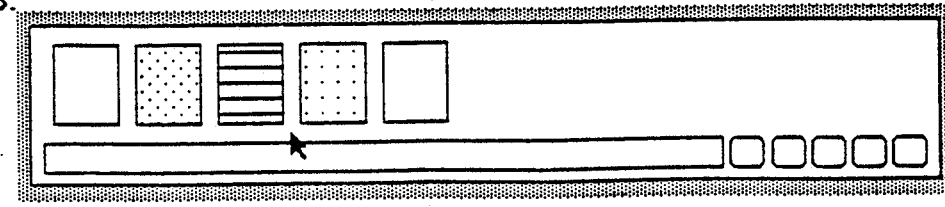

Referring to FIG. 8, there is shown the movement of an icon into a Phrase Window. The user clicks on an icon in the Access Window. While holding the mouse button down, the user drags a copy of the icon to the desired position in the Phrase Window. The user ends the drag by releasing the mouse button when the icon is properly positioned, causing the computer to deposit the icon in the specified position. Here the icon with horizontal stripes in the Access Window is deposited between two dot-shaded icons in the Phrase Window.

(Function #10) The can also move an icon from one phrase window to another. In one embodiment, there are two phrase windows: one for each of two users. In this event, the pointing device is activated and the desired image of the icon is "dragged" from one location in one phrase window to a desired position in another phrase window. The dragged icon is inserted in the second phrase window between whatever icons lie where the drag has ended or else the dragged icon is placed in the right-most position of the current phrase being constructed.

Figure 9A:
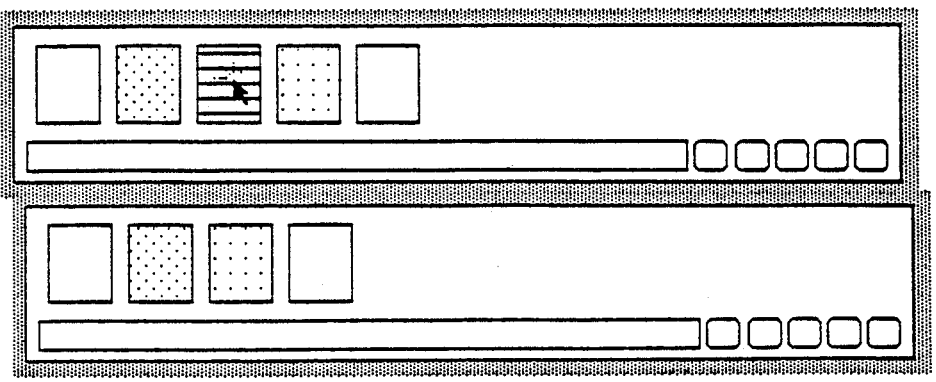
Figure 9B:
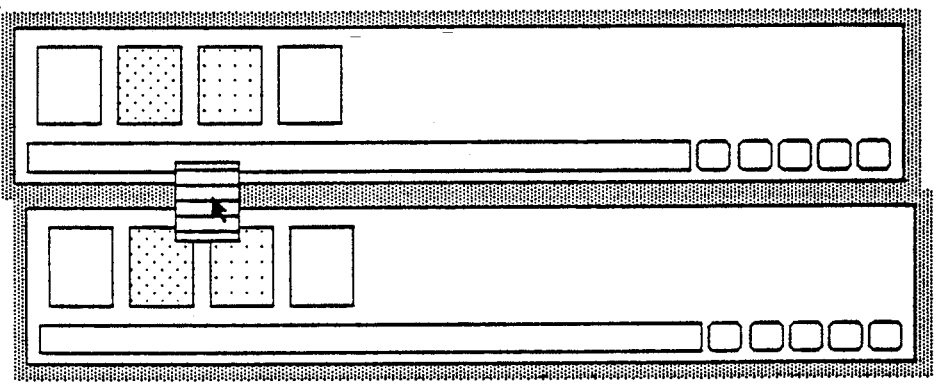
Figure 9C:
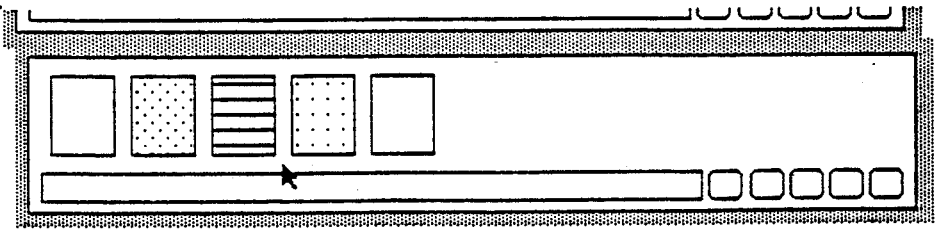

Referring to FIG. 9, there is shown the movement of an icon from one Phrase Window to another. The user clicks and drags the desired icon from its initial position in one Phrase Window into the intended position in another Phrase Window. The icon itself (rather than a copy of the icon as in Function #9) is removed from the initial Phrase Window, and it is deposited by ending the drag over the targeted Phrase Window as in Function #9.

Figure 10A:
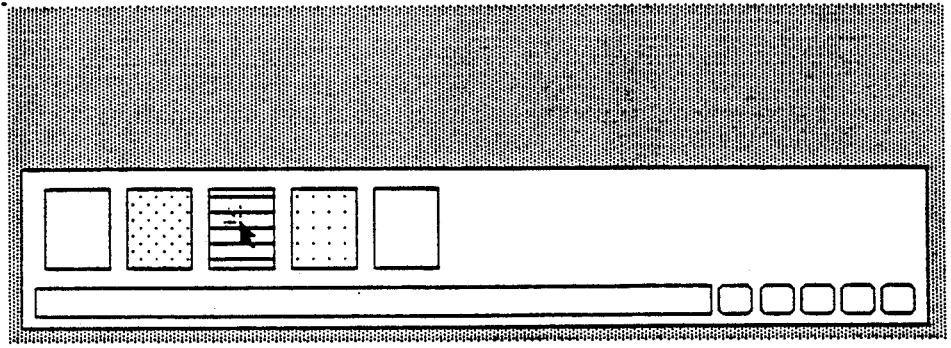
Figure 10B:
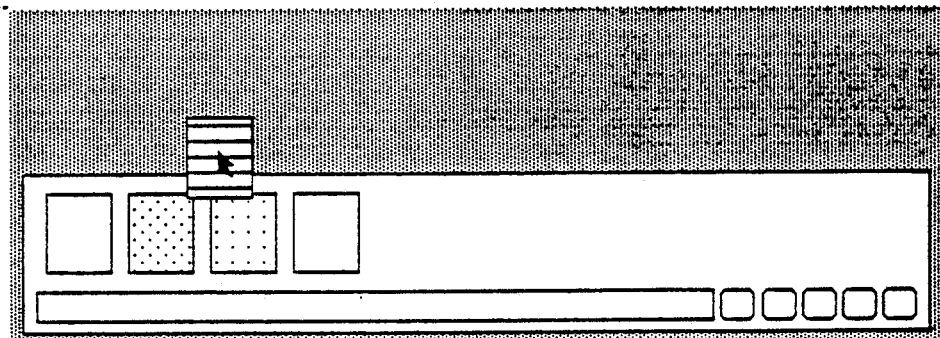
Figure 10C:
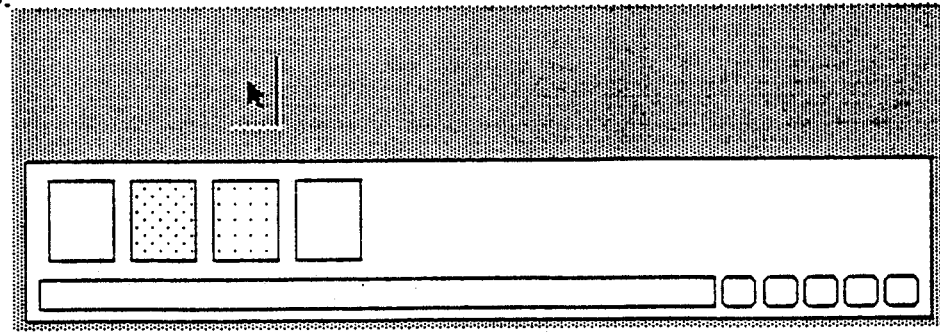
Figure 11A:
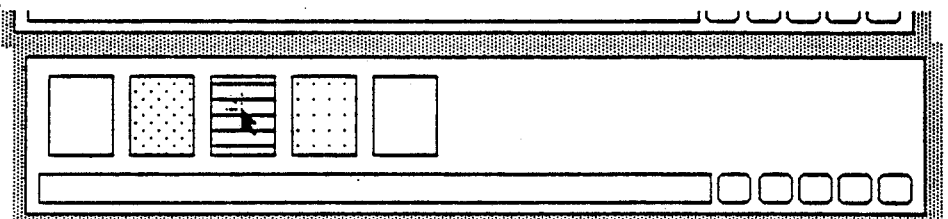
Figure 11B:
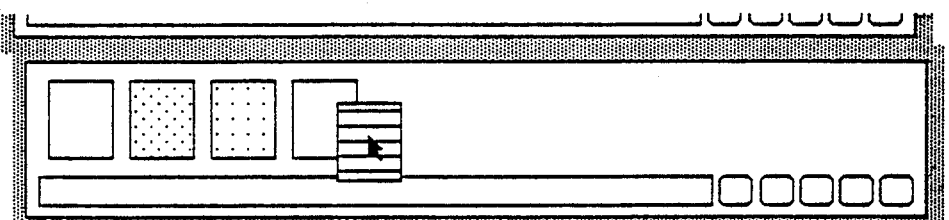
Figure 11C:
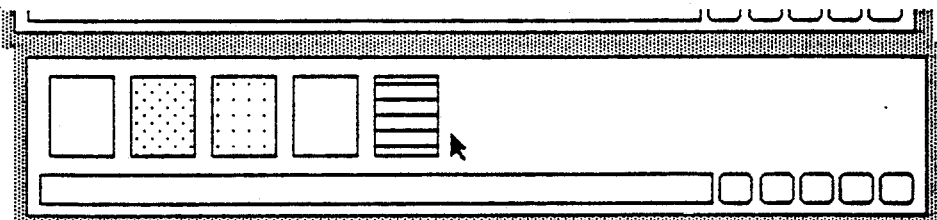

(Function #11) The program permits the user to get rid of an icon in a phrase window. To do this, the user activates the pointing device by "clicking and dragging" the undesired icon from the current phrase window. The mouse button of the pointing device is released to end the drag. This can be done anywhere except over another phrase window. Thereafter, the computer removes the display of the dragged icon from the computer display screen. (See FIG. 10). 20 (Function #12) The program also permits the user to rearrange the icons in a phrase window. To do this, the pointing device is activated by "clicking" the mouse when the cursor is over the desired icon. The desired icon is "dragged" by holding down the mouse button from the current position in a phrase construction window. The mouse button is released to end the drag with the icon in a desired position over the phrase window. The icon is then inserted in the position between the icons beneath where the drag has ended, or is placed in the right most position of the current phrase being constructed. Again similar to Function #10, when the icon is moved from one location to another, the icon itself, rather than the copy thereof, is moved. (See FIG. 11).

(Function #13) The program also allows the user to store phrases constructed in a window "stack". If so, the user "clicks" on the "store in stack" button in that window. The "store in stack" button would be one of the control buttons H illustrated and shown in FIG. 1. The phrase disappears from the screen and is saved in a stack in the computer's memory. The stack holds the various phrases saved in the order with the last saved stack being the most immediately available, in the event of retrieval.

(Function #14) The user may also wish to access a phrase stored prior to the current phrase on display. In that event, the "up in stack" control button is activated. The prior stored phrase appears in that window replacing the phrase displayed at the beginning of the interaction.

(Function #15) If the user desires to access a phrase following the current phrase being constructed in the window, the user then activates the "down in stack" button in that window. Then, the next phrase down in the stack appears in the window, replacing the one that was displayed at the outset of the interaction.

(Function #16) If an entire phrase is desired to be eliminated from the stack, then the user clicks on the "cut" button in the window. The phrase is blanked out; prior and following phrases are then linked together in the stack list.

(Function #17) If the user desires to hear the phrase being spoken by the computer, then the user activates through the pointing device a button in that Phrase Window which is representative of the action of "speak". The text that is displayed is then spoken by the computer.

(Function #18) Alternatively, the user can cause an icon to "speak" its own name, i.e. convert the iconic representation of a word into audible representation of that word. The user moves the cursor over the icon in the Access Window and activates it. This causes the program to output audibly the audio representation of the icon.

(Function #19) The user can also display the Access Window from which an icon in a phrase window was accessed. This is accomplished by activating the cursor on the desired icon in the phrase construction window. The display from which the indicated icon was selected appears in the access window.

(Function #20) The user can also replace the text displayed beneath icons in a phrase construction window. In that event, the pointing device is activated and may be "dragged" to designate a portion of the text to be replaced. The desired replacement text can be inputted through the keyboard. The input text through the keyboard is inserted at the point designated, replacing any text which was selected by the drag.

(Function #21) The user can also restore text which is conventionally associated with icons. In that event, the pointing device is activated and the cursor is clicked and dragged on any icon in the window a short distance compared to the icon's overall size so that when released the icon returns to its original position, thereby "jiggling". The button on the mouse is released to end the drag. The original text conventionally associated with the icons is then restored.

(Function #22) The program also has the capability of producing a grammatical natural language, such as English, Spanish, French etc., translation of the meaning or sense associated with the displayed images. In that event, the user first constructs an iconic phrase in one of the Phrase Windows. Then the user activates a text area beneath the plurality of icons in the Phrase Window. The computer responds by generating a graphical translation in a selected natural language, if there is one. Otherwise, word-for-word equivalents are displayed as before.

In the operation of this function, as previously discussed, the user constructs a phrase in one of the Phrase Windows. When the user activates the cursor over the text area to generate a natural language representation of the iconic phrase, the computer responds by first internally creating a parsed syntactic representation associated with the iconic phrase. As previously discussed, the icons have a part of speech (e.g. noun, verb etc.) feature associated therewith, often graphically differentiated when the icons are animated (see Function #8). The computer generates a parsed representation of a sentence associated with the iconic phrase based upon the parts of speech feature. A parsed syntactic representation can include a verb phrase, a noun phrase, a prepositional phrase, an adjective, or an adverb.

Any verb phrase can be further characterized as comprising either a verb, a verb plus an adverb, a verb plus a noun phrase, or a verb phrase plus another verb phrase.

Any noun phrase can be further characterized as comprising either a noun, a noun phrase plus a prepositional phrase, a modifier plus a noun phrase, a quantifier plus a noun phrase, or a noun phrase plus another noun phrase.

Any prepositional phrase can be further characterized as comprising either a preposition plus a noun phrase or a preposition phrase plus another preposition phrase.

Knowing the parts of speech feature of each of the icons in the Phrase Window and the order of the icons permits the computer to generate the parsed syntactic representation of the iconic phrase. Further, with language specific rules for particular languages, the computer can generate the textual language representation of the iconic phrases, in any of the selected languages. The user may select the natural language by activating an image of the geographical region of the world, for the translation to the desired natural language. Thus, for example, if the user activates an image of the United States, the computer would translate the iconic phrase into English text. In this manner two "normal" users who do not speak the same language can communicate with one another, with one using iconic phrases and the computer translating the phrases into a different natural language.

In fact, for vocabulary and constructions covered by the system, in combination with Function #23, a first user can input text in one natural language into the computer, with the computer generating the iconic phrase. Thereafter, the computer can convert the iconic phrase generated into another natural language.

Referring to FIG. 12, there is shown a schematic diagram of the translation of an iconic phrase into a natural language. In step 1, a simple left-to-right string of icons is assembled, and the user clicks the cursor in the text display area of the phrase window to signal the desire to begin translation. Cursor tools of various shapes can indicate translations into various natural languages. In step 2, a parser which contains general rules about how simple phrases are constructed, assigns a tree-structured parse to the initial left-to-right string. This specifies the syntactic relations between phrase items. In step 3, the parsed phrase is passed to a translator, which contains a language specific lexicon and grammatical rules, and generates the text.

(Function #23) For a vocabulary and construction covered by the system, the program can also convert words inputted through the keyboard by a "normal" user into an iconic representation for an aphasic or a language deficient user. In that event, the "normal" user first must clear the area in his/her portion of the phrase construction window. A cursor is then activated in the text area of the phrase construction display, with the "normal" user typing in the text. The "normal" user then activates the cursor in the icon display area to have the iconic representation of the inputted text displayed in the iconic format in the phrase construction window of the aphasic user.

(Function #24) The program also allows the user to go back up to a previous level hierarchically above the current display in the access window. In that event, the user activates the pointing device to activate the cursor in the "ascend hierarchy" area at the top of the access window. The higher level is displayed in the access window if it exists. Otherwise, no change in the display in the access window occurs. Thus, for example, if the current display is of particular beverages (e.g. coffee, tea, milk etc.), the user can move to a higher level and have the generic category beverages displayed.

(Function #25) The user can also control an external apparatus via this system on the computer. An icon representing the apparatus is displayed on the display. When a valid command to that apparatus is constructed, a button designating that apparatus becomes available for activation. The user positions the cursor over the apparatus icon and activates it. The activation action causes the "display" of the icon to change, e.g to reverse video, signifying activation of the icon. The computer then sends a signal to the apparatus to control it.

(Function #26) The program also allows the user to display a next level down in the access window hierarchy. In that event, the user activates the pointing device by clicking the cursor on any icon which affords access to a lower level in the access window hierarchy. That is, the activation of an icon results in a new display filling the access window and showing hierarchically subordinate icons, if such a subordinate display exists. Thus, for example, activating an image of a "noun" may bring up a display of several subcategories, including an icon for "food". The user may then utilize the desired icon and use it in the communication session. In an alternative embodiment, the computer generates the text associated with the displayed iconic phrase (see Function #22). The icon traversed to display the subcategories may or may not display animation. From each level that appears in the Access Window, other lower levels in the hierarchy may be brought to display in the access window, similarly.

Another use of this function is in generating phrases which are logically linked. For example, the computer can generate a plurality of icon like images which represent the first in a series of sequentially stored phrases. The user, after viewing the first phrase, activates an icon with a subsequent phrase as a hierarchically subordinate node, which causes the computer to generate the next phrase in sequence to the first phrase. An icon used in this manner is termed a "control icon". A particular application for this function is in the nature of displaying information which are in the format of procedural instructions (e.g. a recipe), as in cooking, assembling, etc. with ordered tasks.

(Function #27) Finally, having accessed a new level in the hierarchy, the user can return to any of the capabilities mentioned heretofore, and exercise them at the new level.

Although the foregoing description of the program is made with respect to a number of discrete functions of the program, it can be seen that a number of functions can be "chained" together to form an effective communication method. Thus, for example, the functions of accessing paradigmatic alternatives (Function #3) and the function of English translation (Function #22) can be used in a single communication session by an aphasic user to communicate with a "normal" person, with the aphasic user understanding the iconic language and the "normal" person understanding the text language.

Referring to FIG. 13(a-1) there is shown a printout of the screen of a display device of a computer showing a particular application of the methods of the present invention.

Figure 13A:
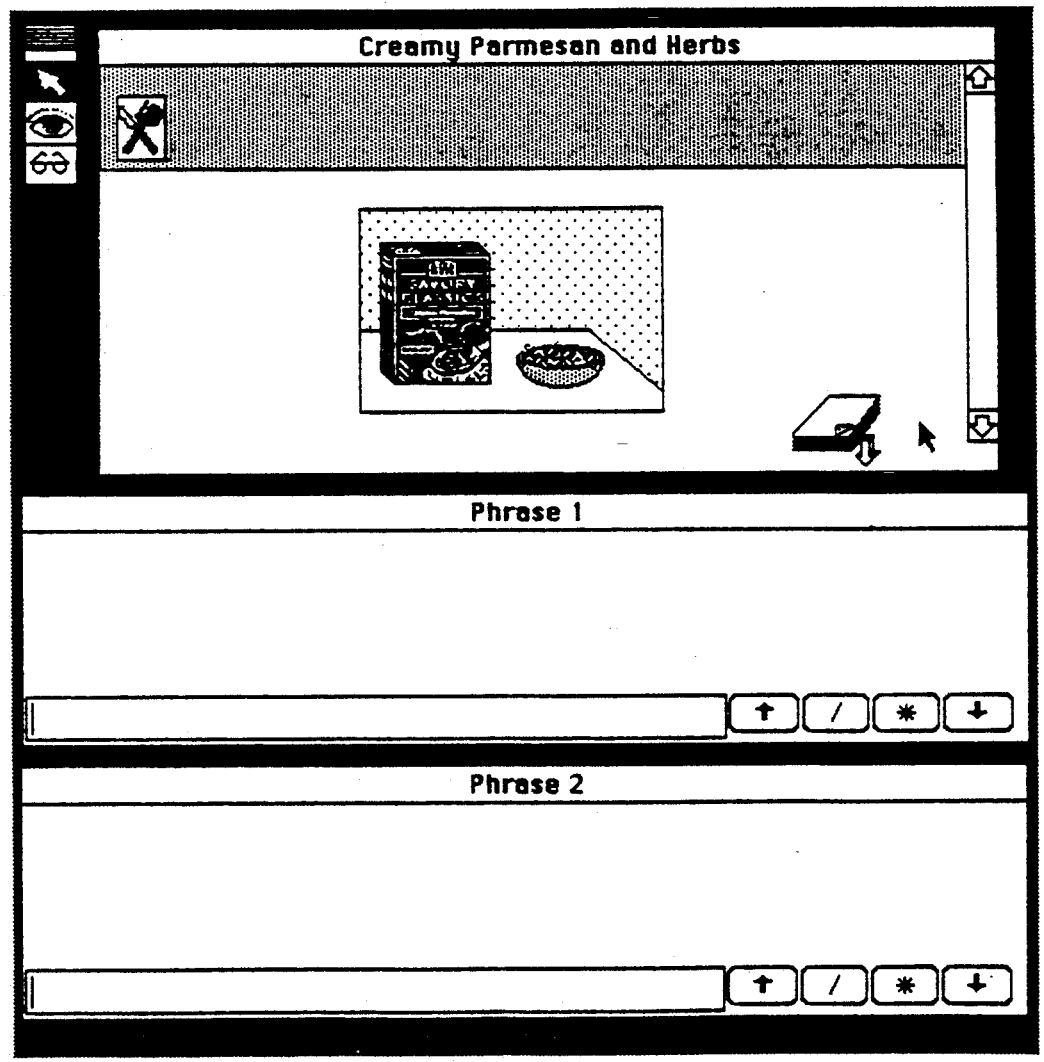
FIGS. 13(a-l) are printouts of the screen display of the program of the present invention executing a particular function of teaching or assisting a user to prepare a recipe.

FIG. 13a is a top level of the program to assist the user in preparing a recipe. The largest window at the top is the "Access Window" and below it are two "Phrase Windows" labeled "Phrase 1" and "Phrase 2". The is in the shape of an arrow and is located in the lower right hand corner of the Access Window. Two other possible cursor tool shapes (an eye, and a pair of glasses) are shown in the upper left hand corner of the screen.

Figure 13B:
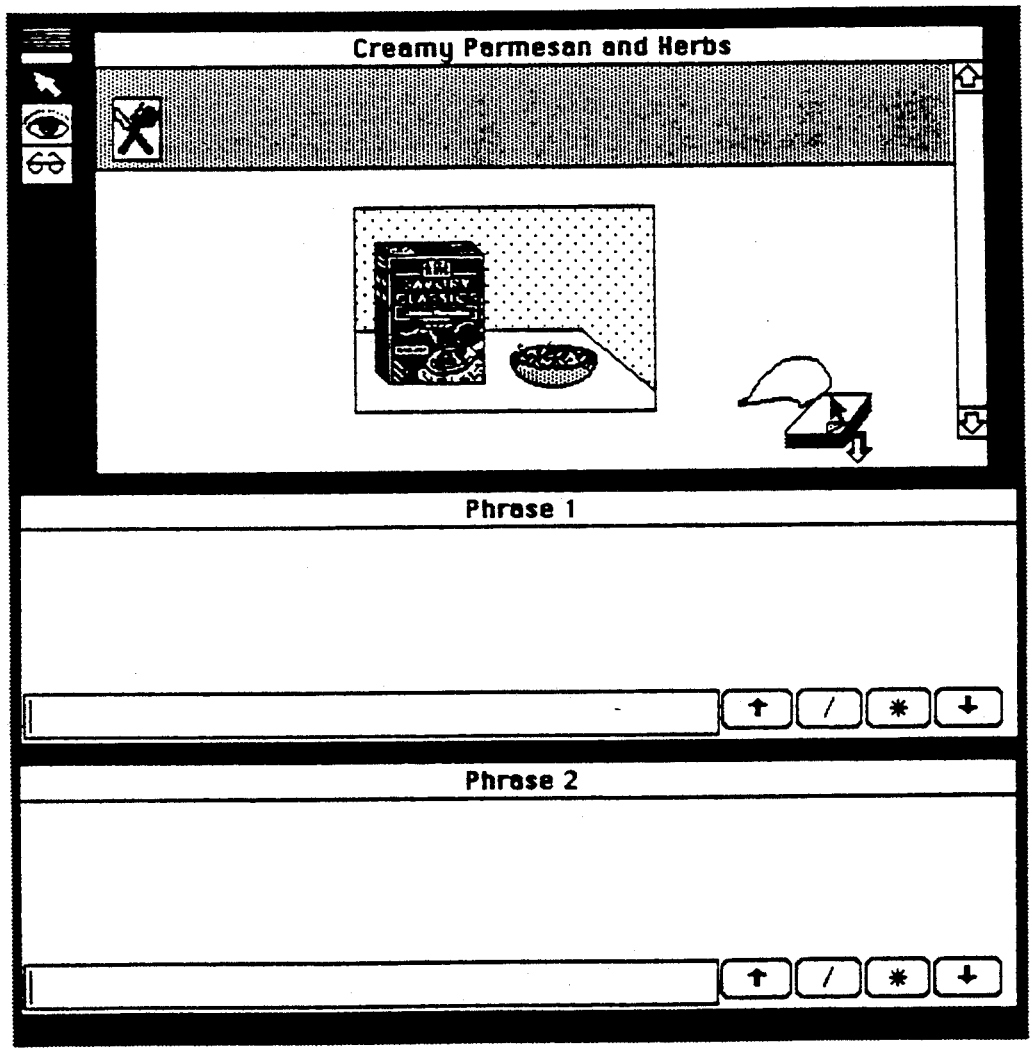

FIG. 13b shows when the cursor is placed on the "control icon" (here in the shape of a notebook) and clicked, the control icon first animates itself to display a page being torn off of the notebook (establishing the appropriate metaphor) and then causes the entire Access Window to be filled with a subsequent display. In this case, a scanned image of the package box mix for the given recipe is shown.

Figure 13C:
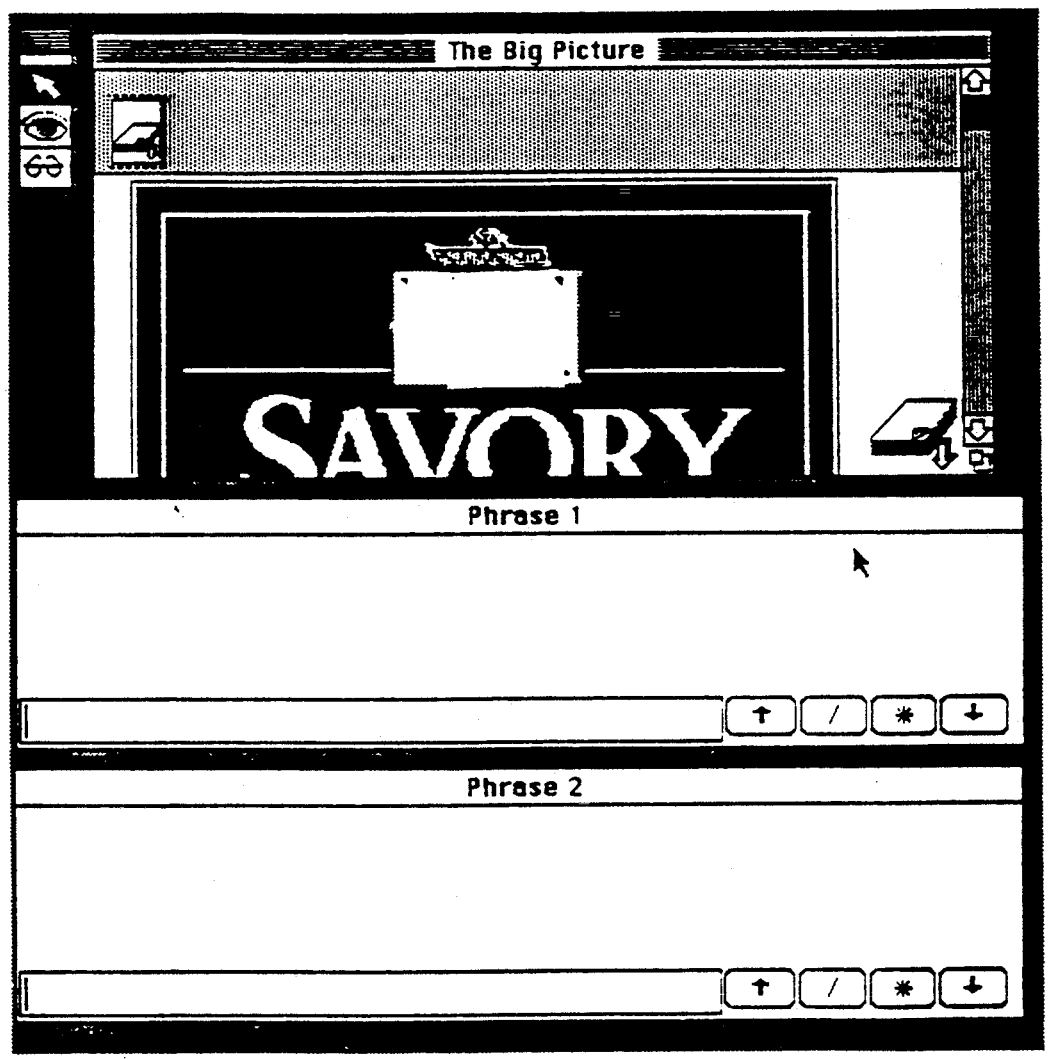

FIG. 13c shows the Access Window displaying a scanned image of the packaged box mix. Shown here in FIG. 13c is only the top portion of the scanned image; however, when the cursor arrow is placed on top of the image and is dragged slightly in any direction, the entire package becomes visible at once. This allows the user to confirm that he/she has the correct package mix. Positioning the arrow shaped cursor on the control icon (notebook) and clicking once more, results in the display shown in FIG. 13d.

Figure 13D:
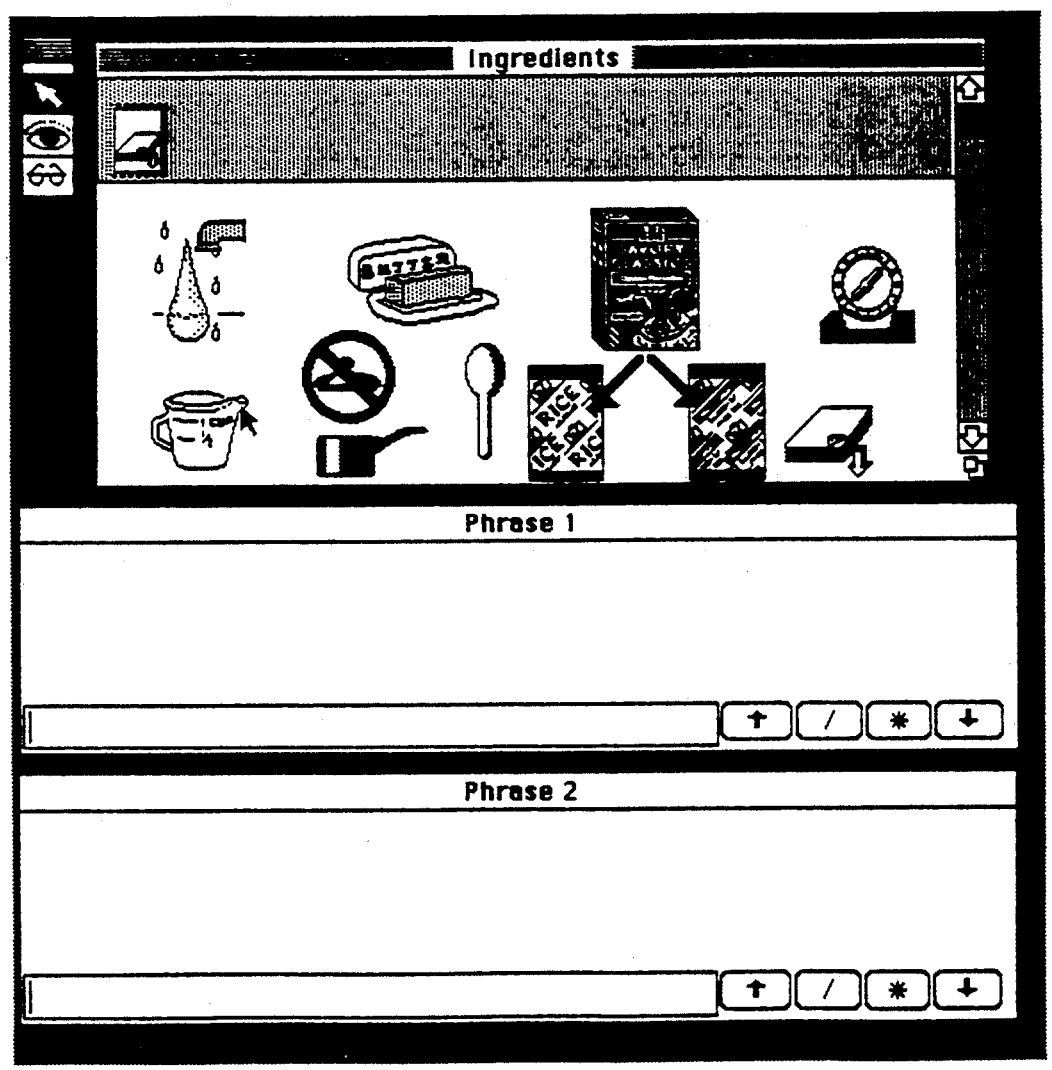

FIG. 13d shows the ingredients and utensils required for the preparation of this recipe. This allows the user to confirm that all utensils are readily available. If the user is uncertain as to the meaning of a particular item, additional information can be obtained by clicking and dragging that icon into one of the Phrase Windows, in which case the meaning is displayed in the text area at the bottom of the Phrase Window. Here the user is about to drag the "measuring cup" icon into one of the Phrase Windows.

Figure 13E:
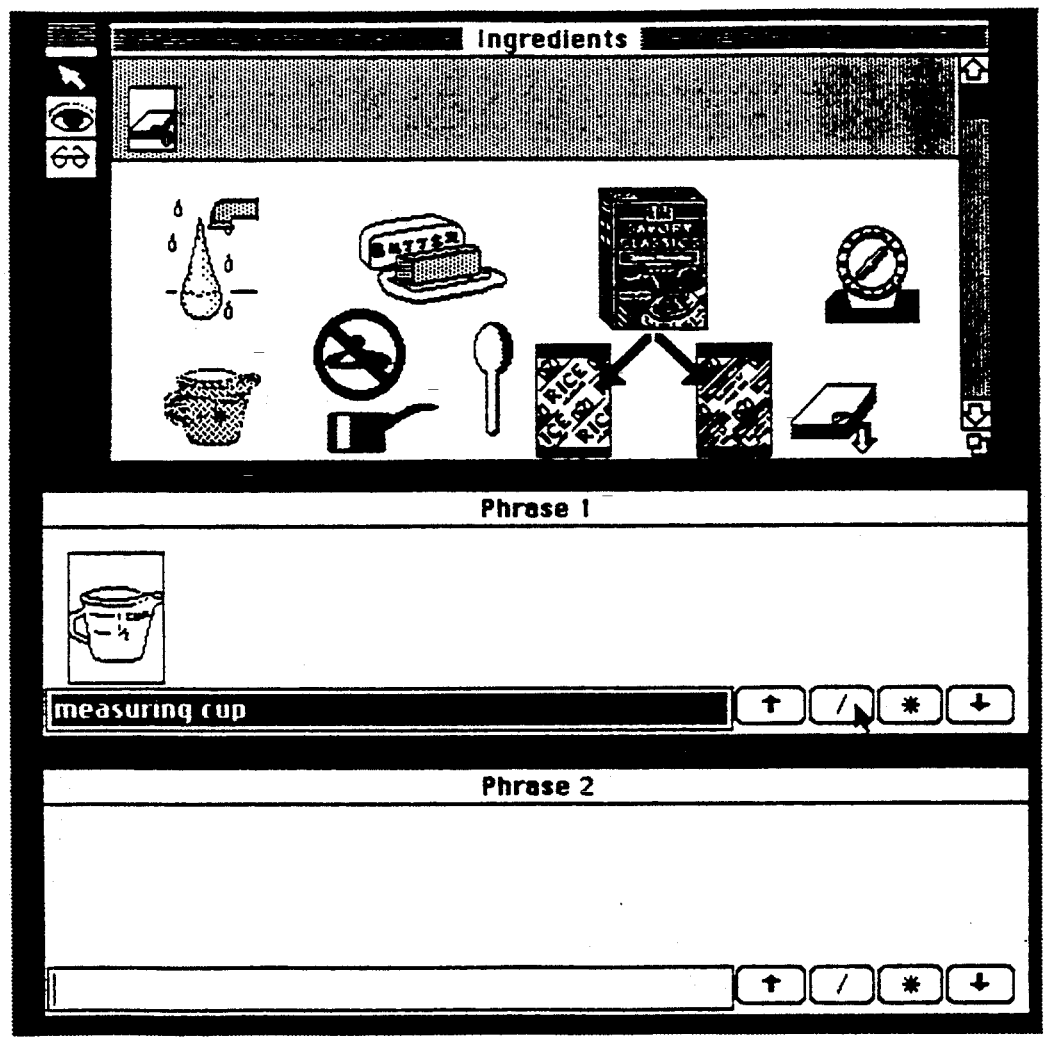

FIG. 13e shows a copy of the "measuring cup" being dragged from the Access Window into the Phrase Window, labeled Phrase 1. The user places the icon in that window by ending the drag by releasing the button on the mouse, when the icon is positioned in the desired location. The computer responds by displaying the text associated with the icon in the text portion of the Phrase Window. If the user desires to clear the Phrase Window, the user clicks on the "slash" button, located beneath the arrow shaped cursor. The result is a clearing of the Phrase Window, as in Phrase 2.

Figure 13F:
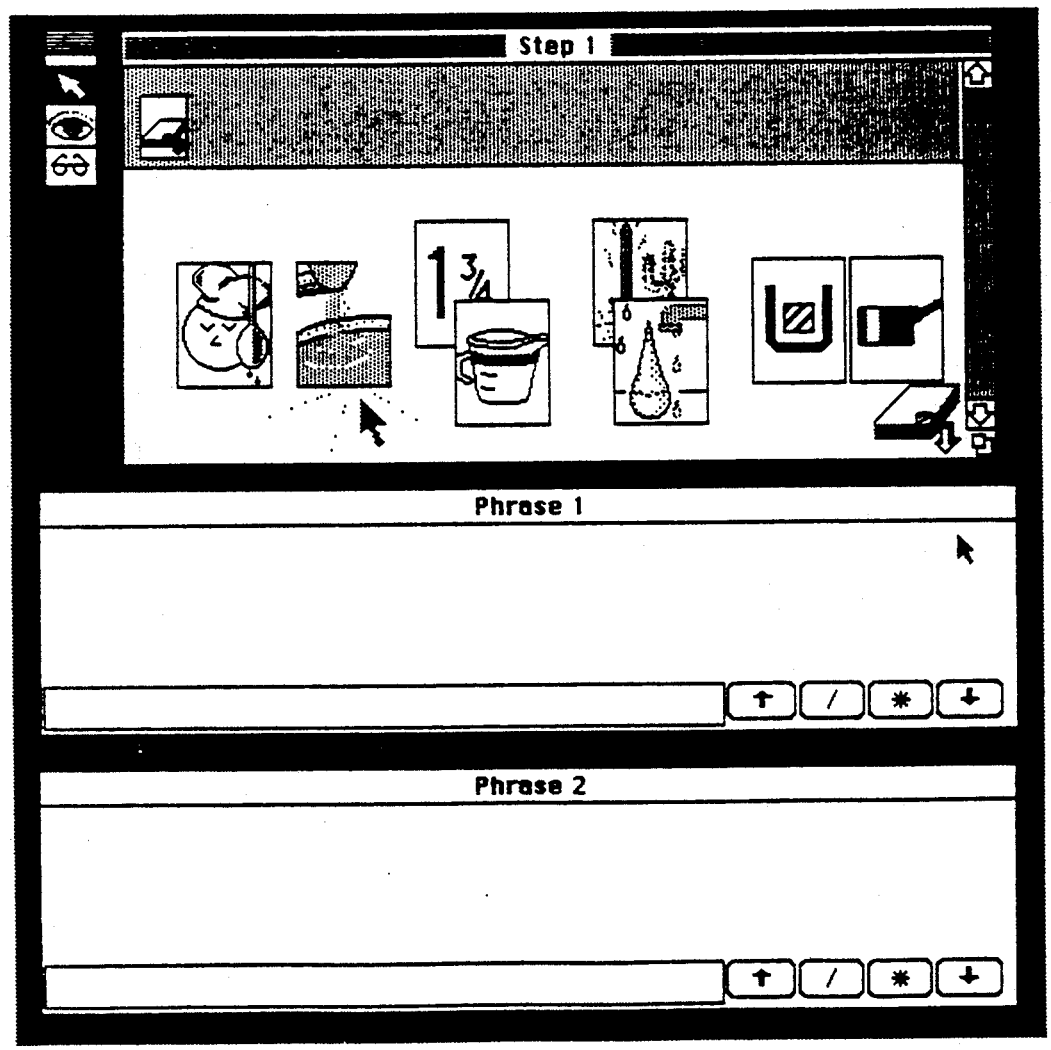

FIG. 13f shows the next step in the recipe, namely the message of "The chef pours 1¾ cups hot water into the saucepan". The communication is accomplished by the icons for [CHEF] [POUR(S)] [1¾] [CUP] [HOT] [WATER] [INTO] [SAUCEPAN], respectively. The icons can be dragged into a Phrase Window to display the textual translation, as previously described. The nonrectangular outline and the grey arrow beneath the icon [POUR] serves as a visual reminder that this icon can be animated by clicking the arrow cursor on it. The animation shows the lower container being filled with a liquid pouring from an upper vessel.

Figure 13G:
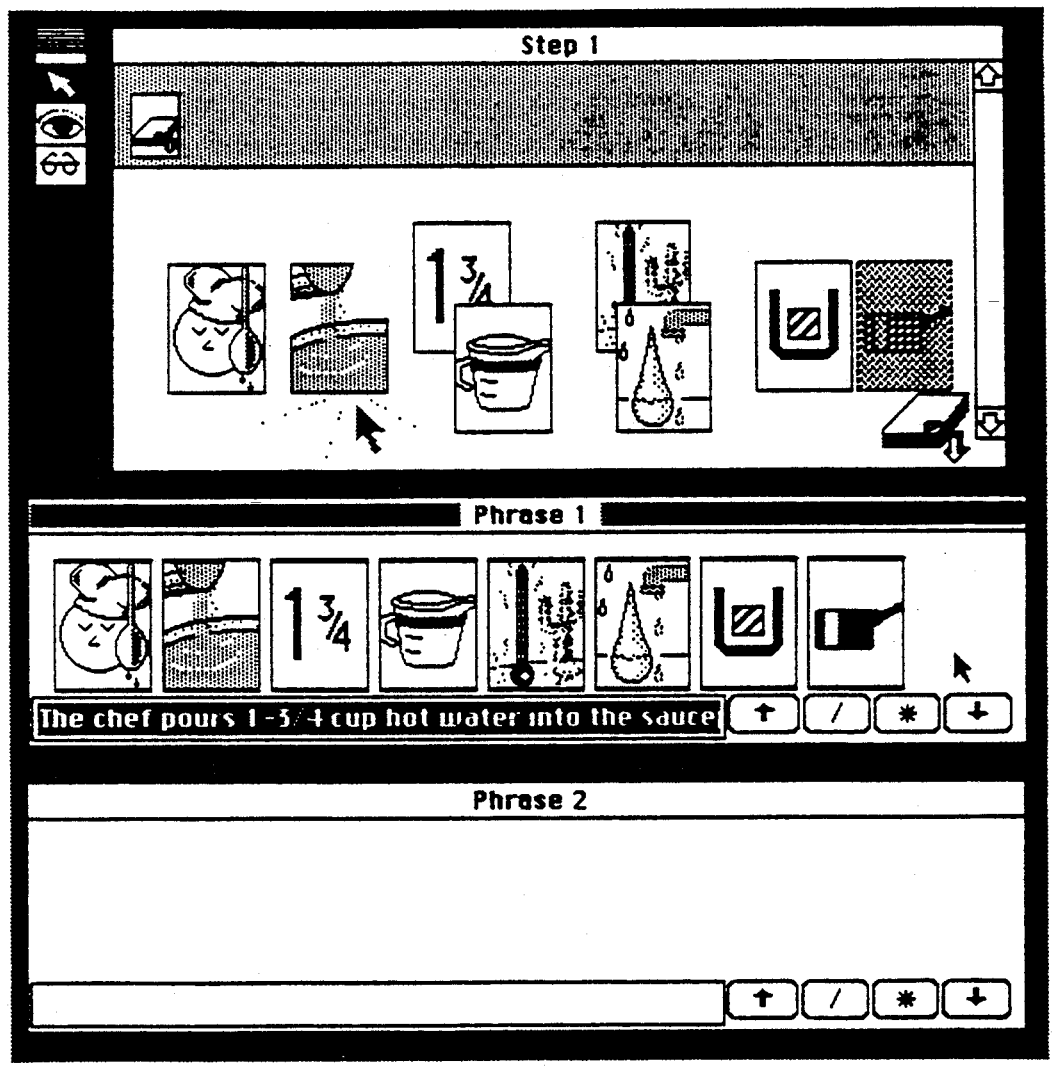

FIG. 13g shows the icons moved into one of the Phrase Windows, with the textual translation displayed. The display of the textual meaning can sometimes be of assistance to an aphasic user, and other communicatively disadvantaged persons, for its corroborative effect, or to help ascertain how meanings are generally apportioned to the icons. Certainly the display of textual meaning assists a "normal" user who is learning a new language. Once the iconic phrase has been assembled, the user can remove it, as previously discussed, or the user can save it for later use. To save, the user activates the "*" (punch down) control button.

Figure 13H:
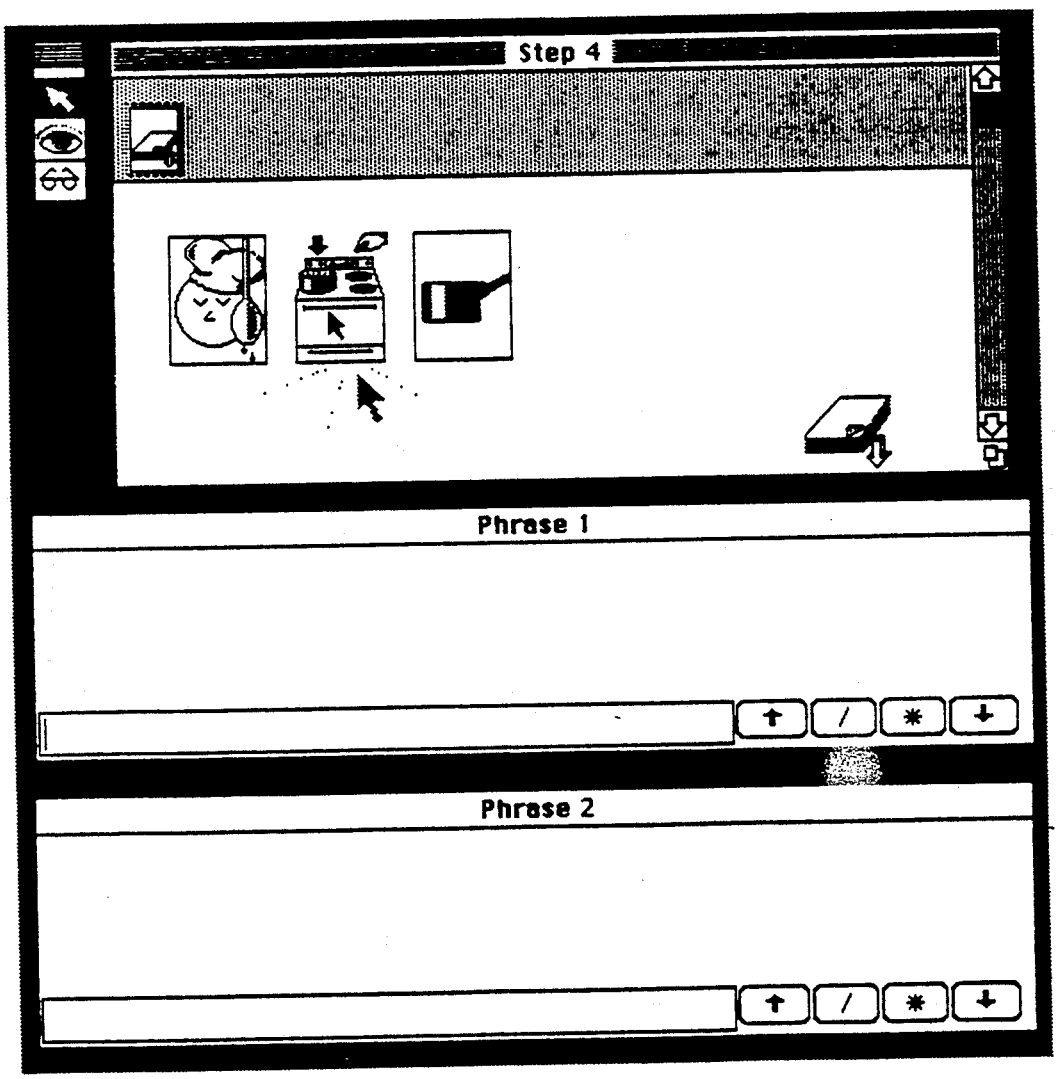
Figure 131:
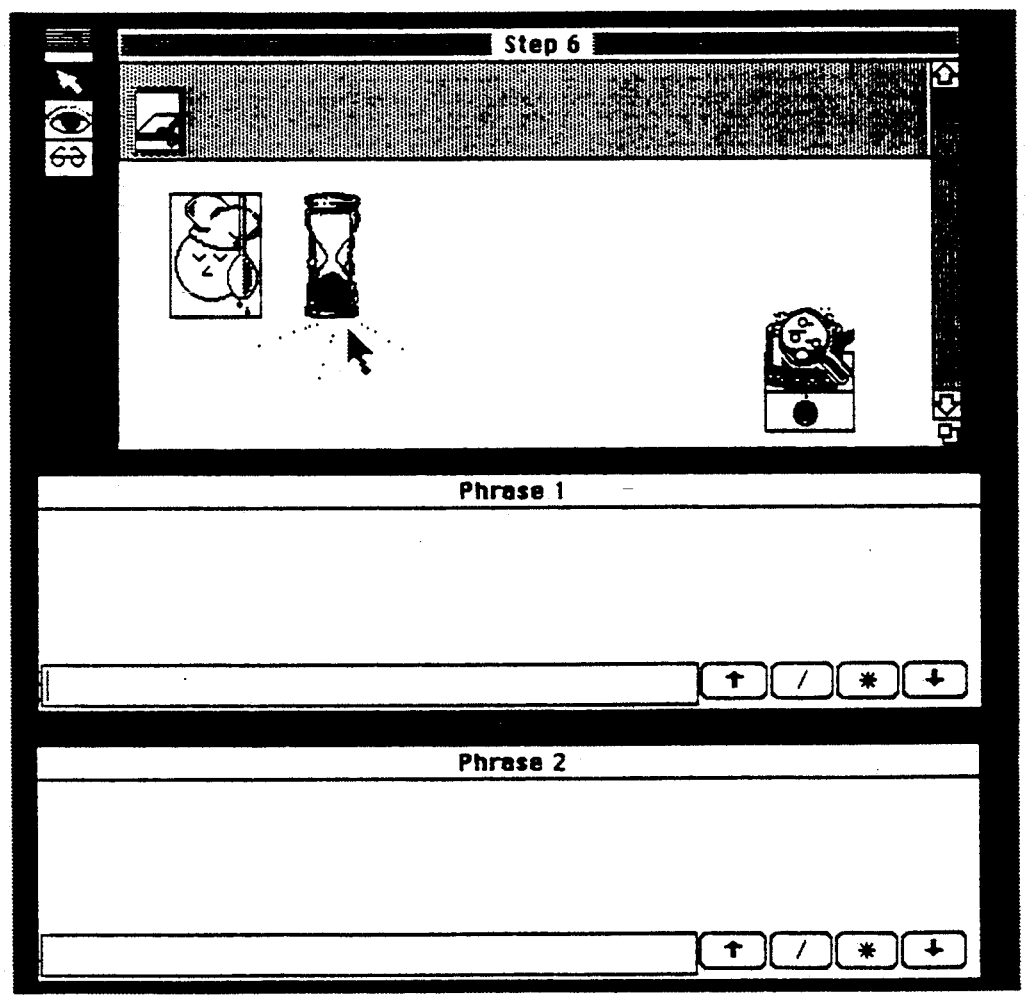

FIG. 13h shows several steps after the last figure. (wherein the iconic phrase instructs the user to add ingredients to the saucepan). The iconic phrase [CHEF] [PUT(S)-ON-STOVE] [SAUCEPAN] appears. The irregular outline and the grey arrow beneath the [PUT(S)-ON-STOVE] icon serves to distinguish the icon as being capable of animation. When activated, the animation shows the hand descending from the upper right holding a pan, which it places on the left front burner on the stove top.

FIG. 13i shows the iconic phrase of [CHEF] [MARK-TIME-PASSING] to mean "The chef waits". In this case the control icon, which permits access to the next level, is no longer a notebook, but is instead a picture of a pot with boiling liquid displayed in the magnifying glass. The icon becomes animated when clicked to show a pot coming to boil, and the magnifying glass serves to focus the attention on the boiling of the liquid. The fact that this boiling icon must be traversed before accessing the next instruction from the notebook, indicates that the pot should have been brought to a boil before the next step is carried out.

Figure 13J:
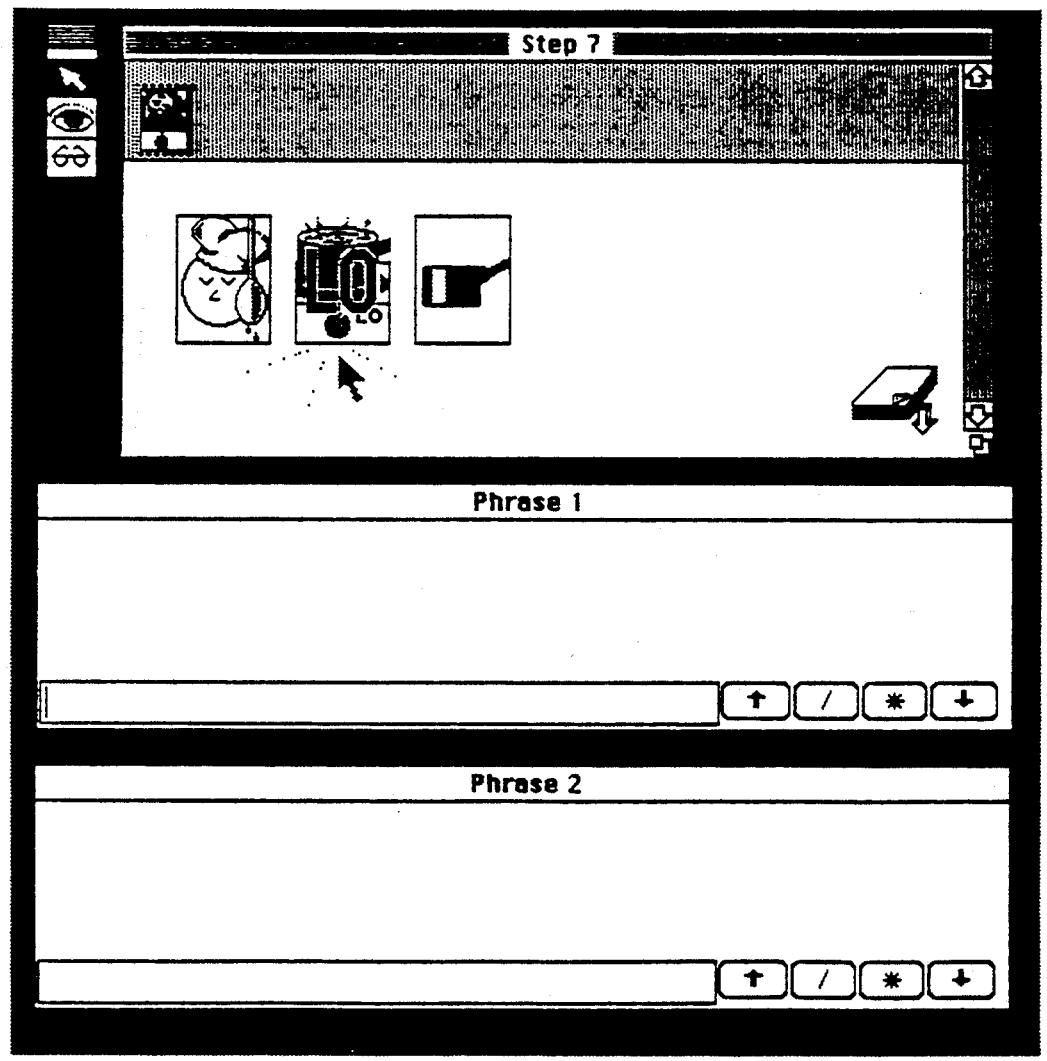

FIG. 13j shows the iconic phrase of [CHEF] [TURN(S)-TO-LOW] [SAUCEPAN] to mean "The chef turns down to low the burner with the saucepan".

The small window above and somewhat to the left of the chef shows in miniature the boiling pot, which is the triggering event for performing this instruction, and is also the previous Control Icon (i.e. the node directly above the current instruction page.)

Figure 13K:
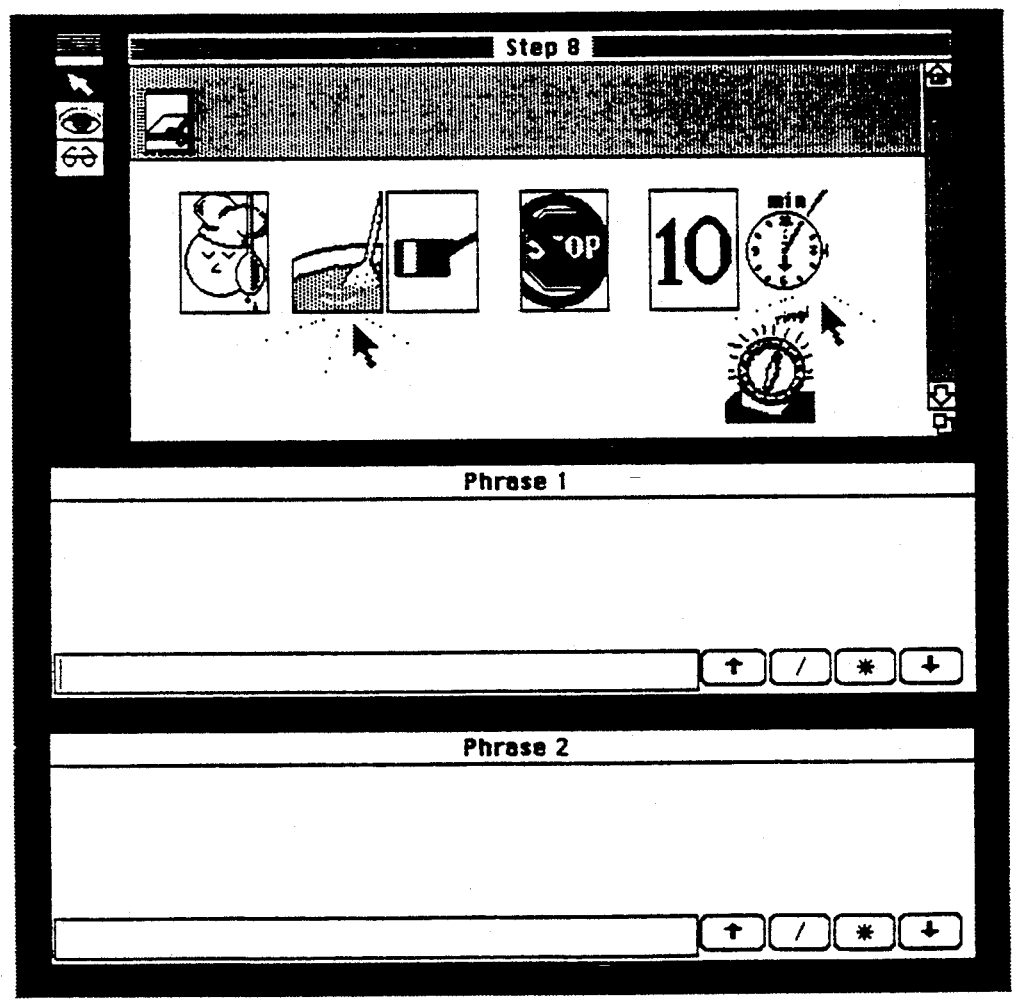
Figure 131:
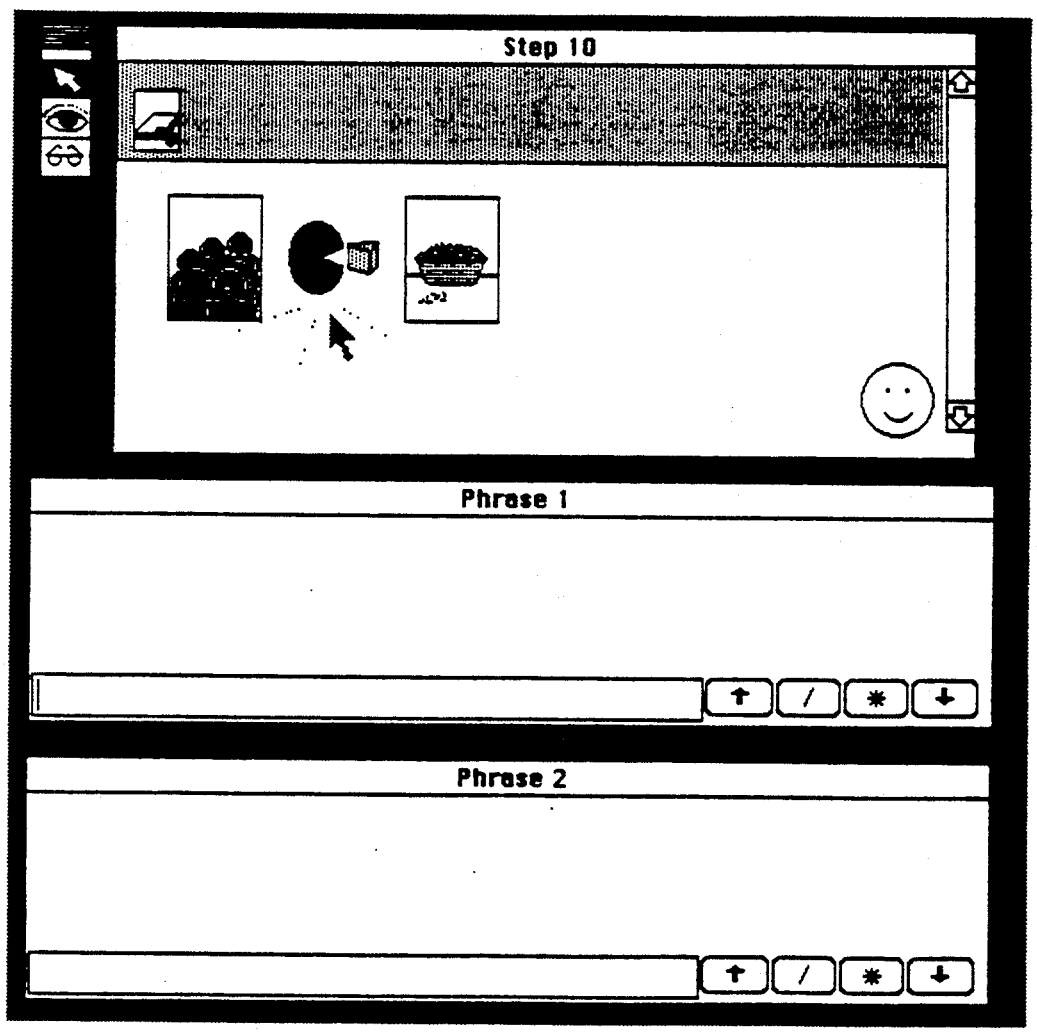
Figure 14A:
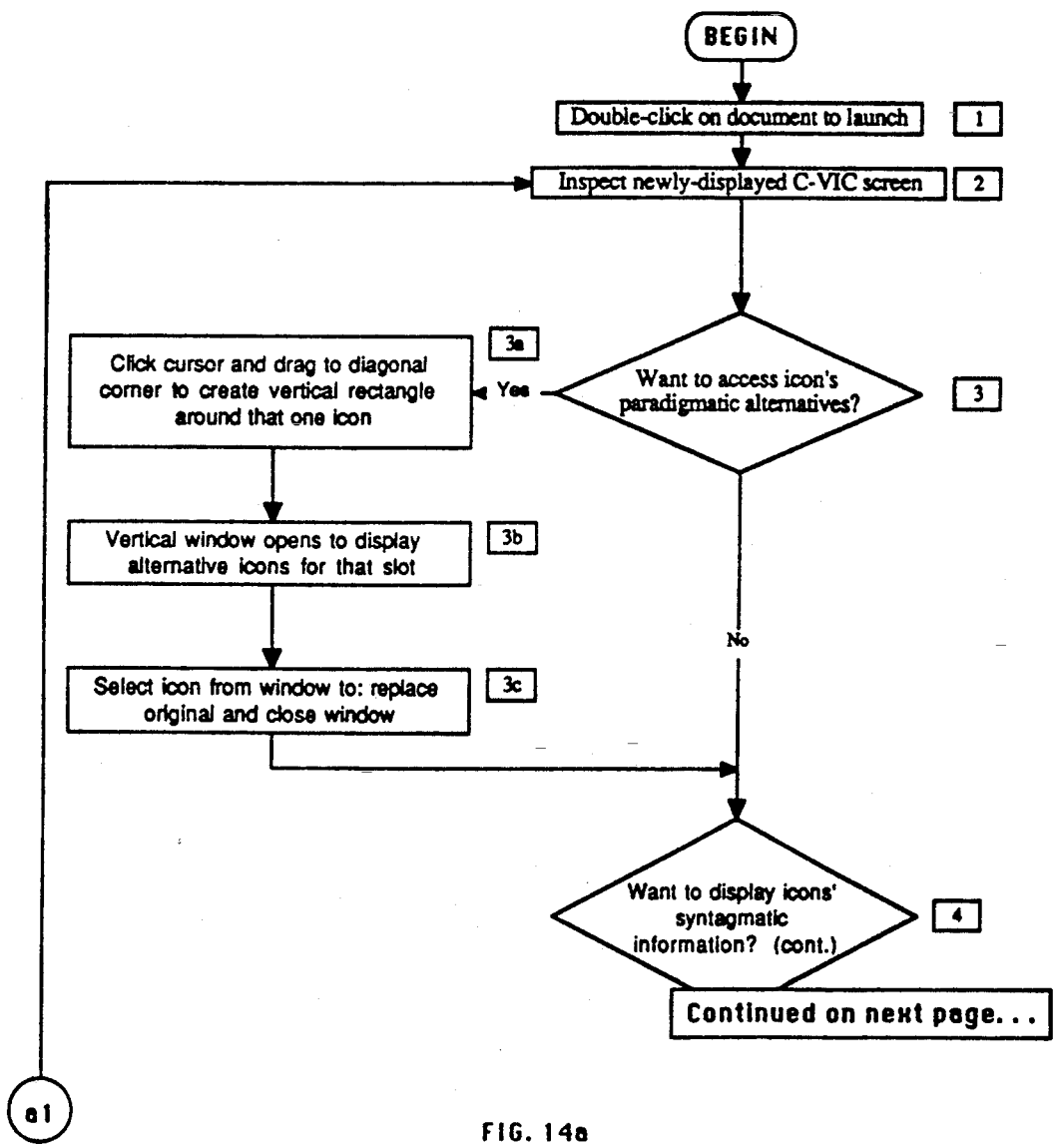
FIGS. 14(a-l) is a flow chart showing the method of the present invention.
Figure 14B:
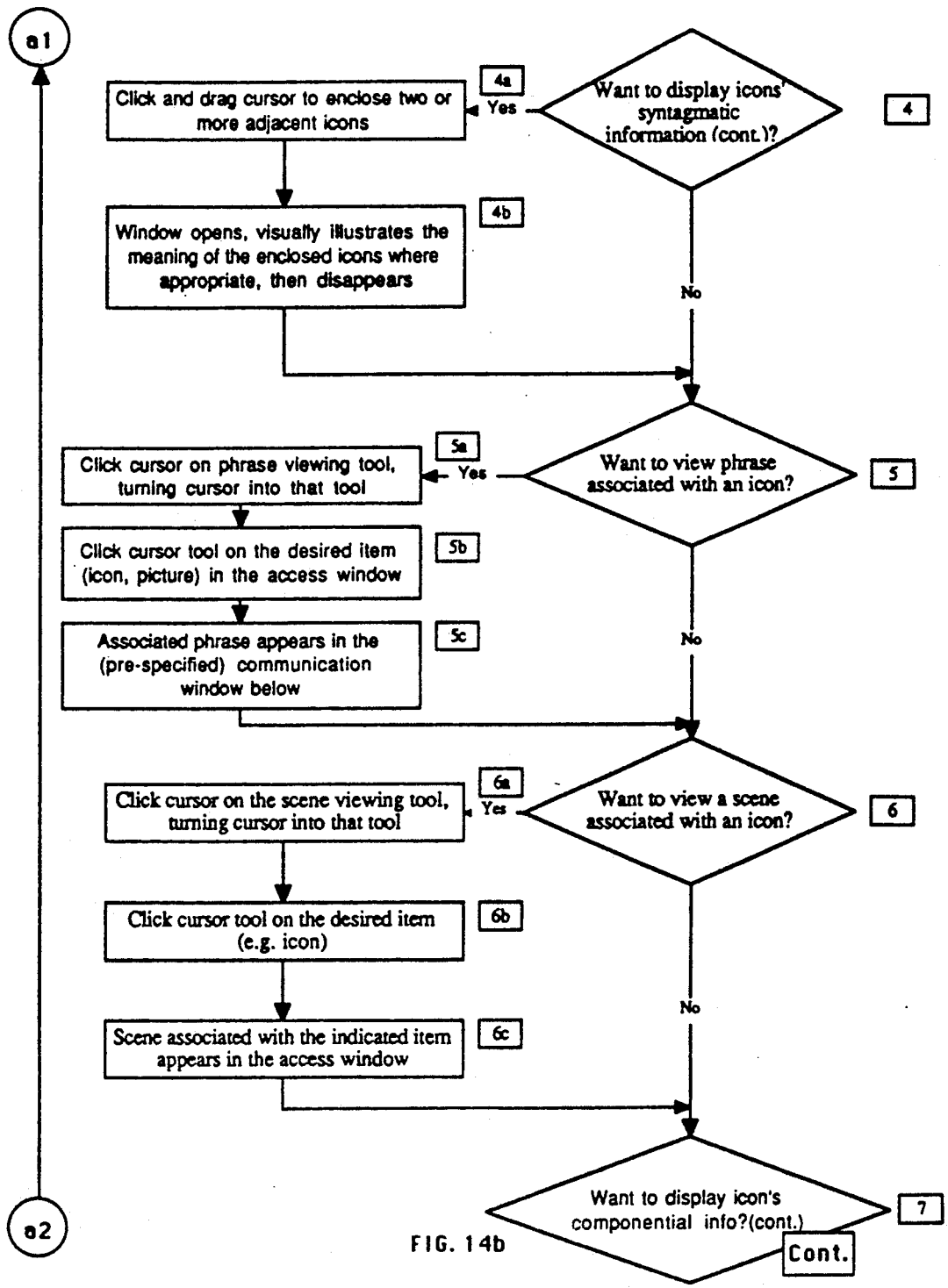
Figure 14C:
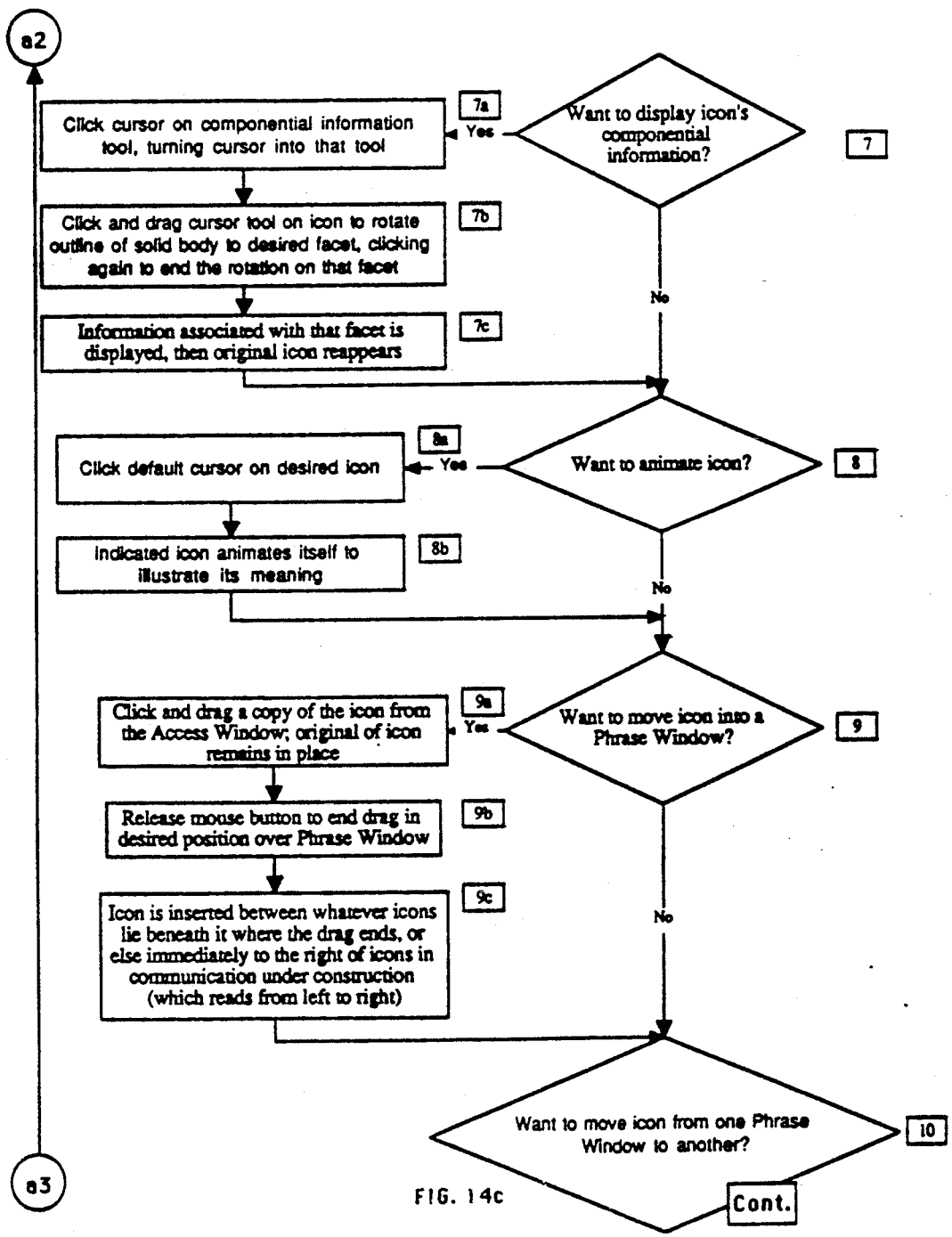
Figure 14D:
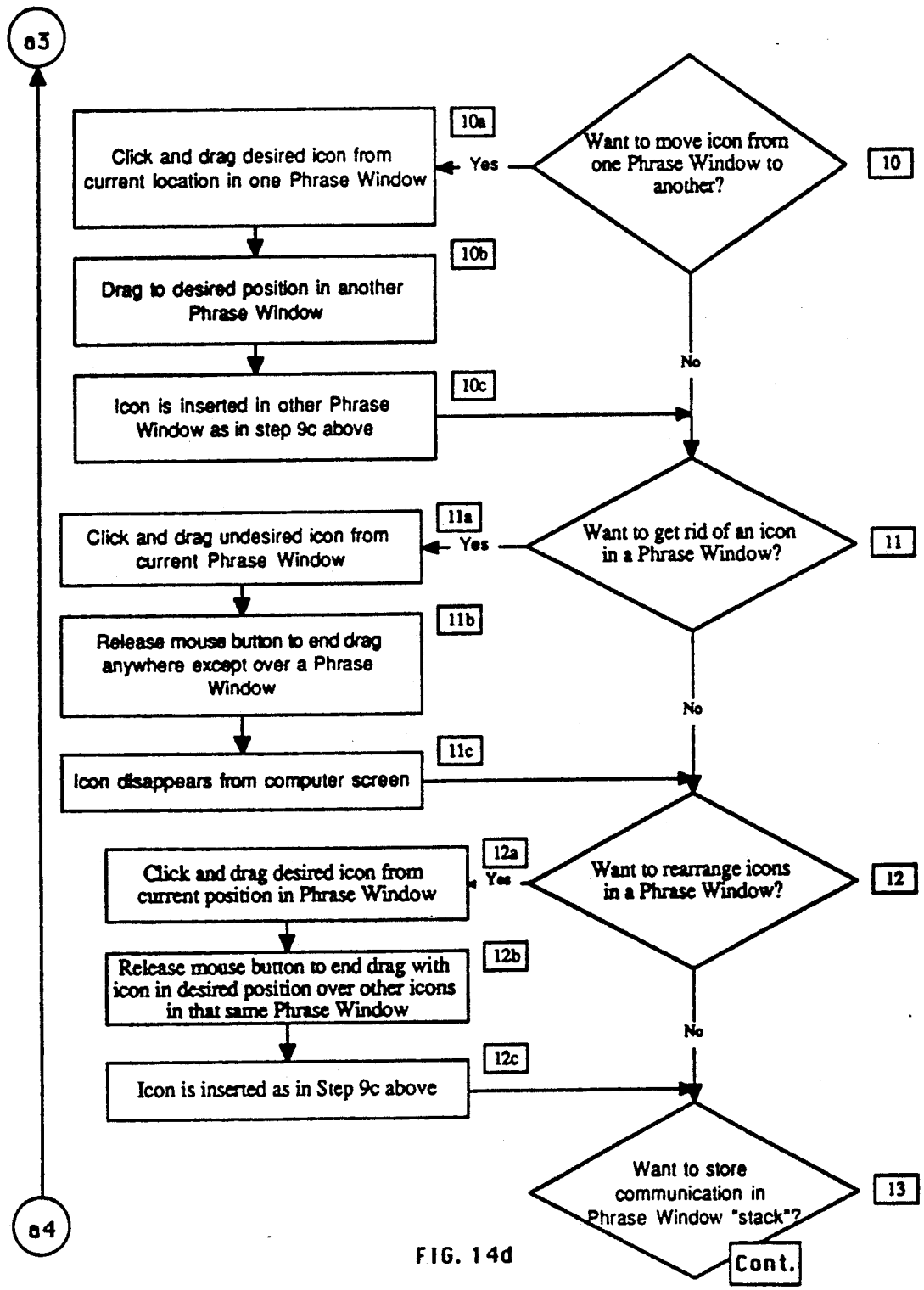
Figure 14E:
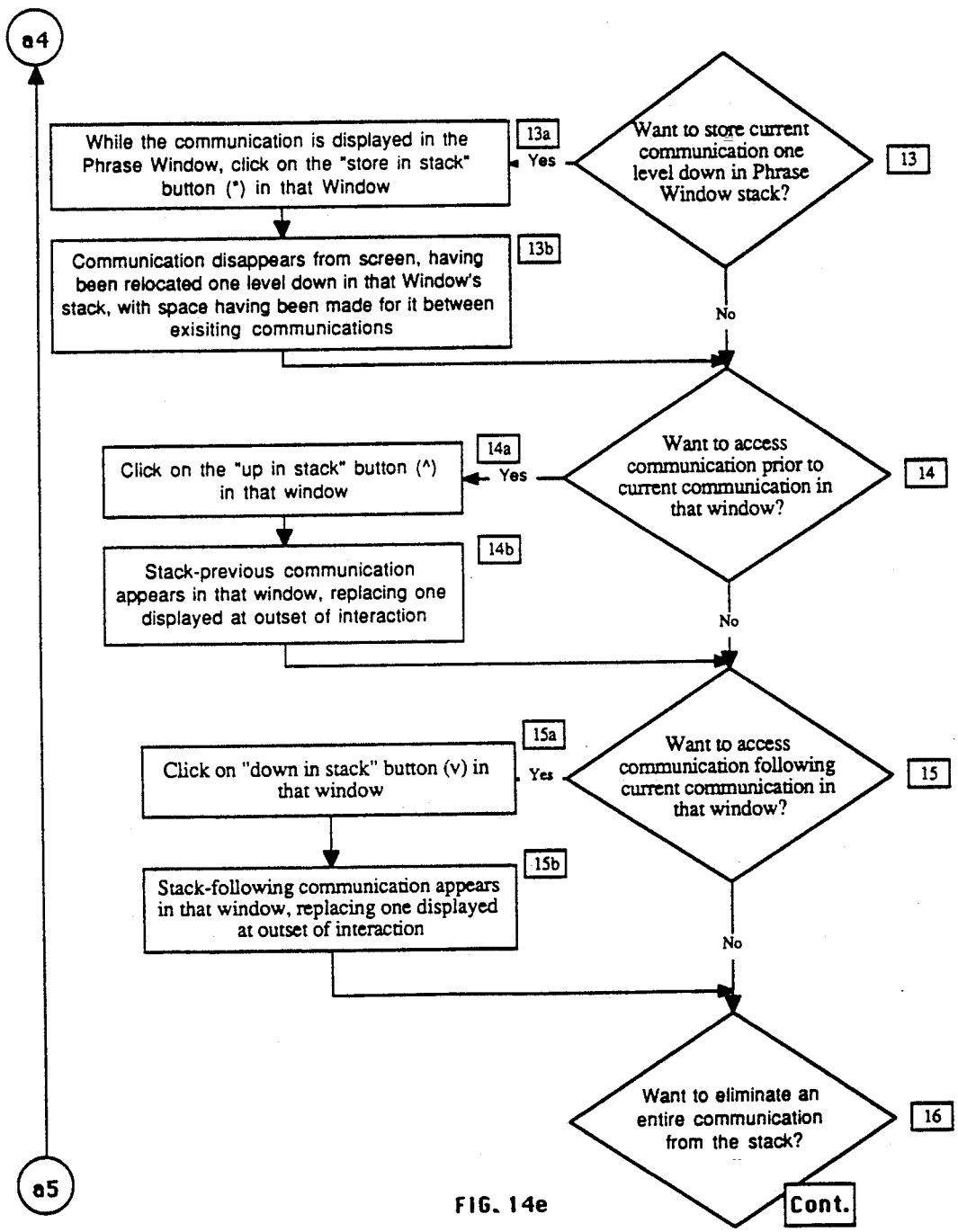
Figure 14F:
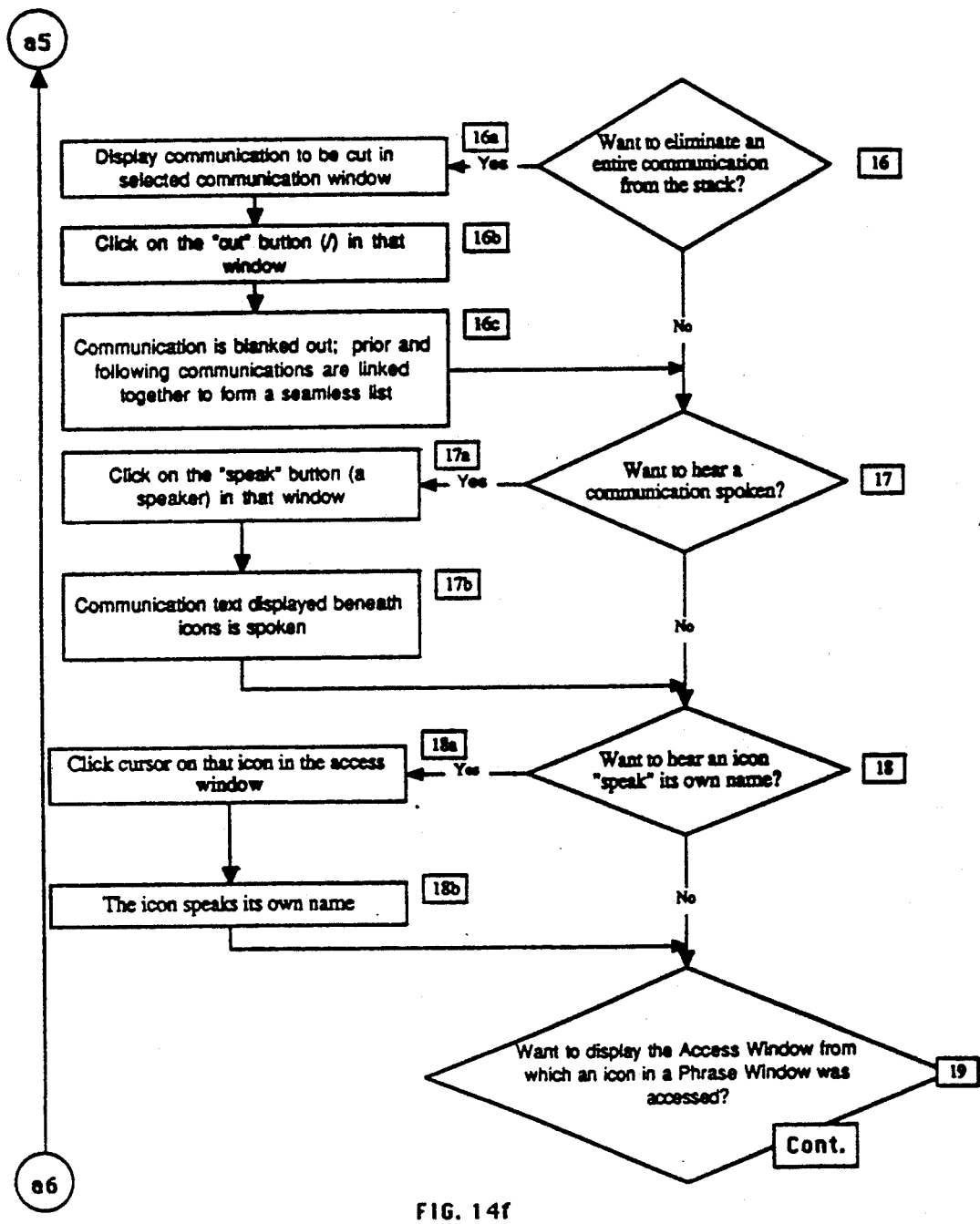
Figure 14G:
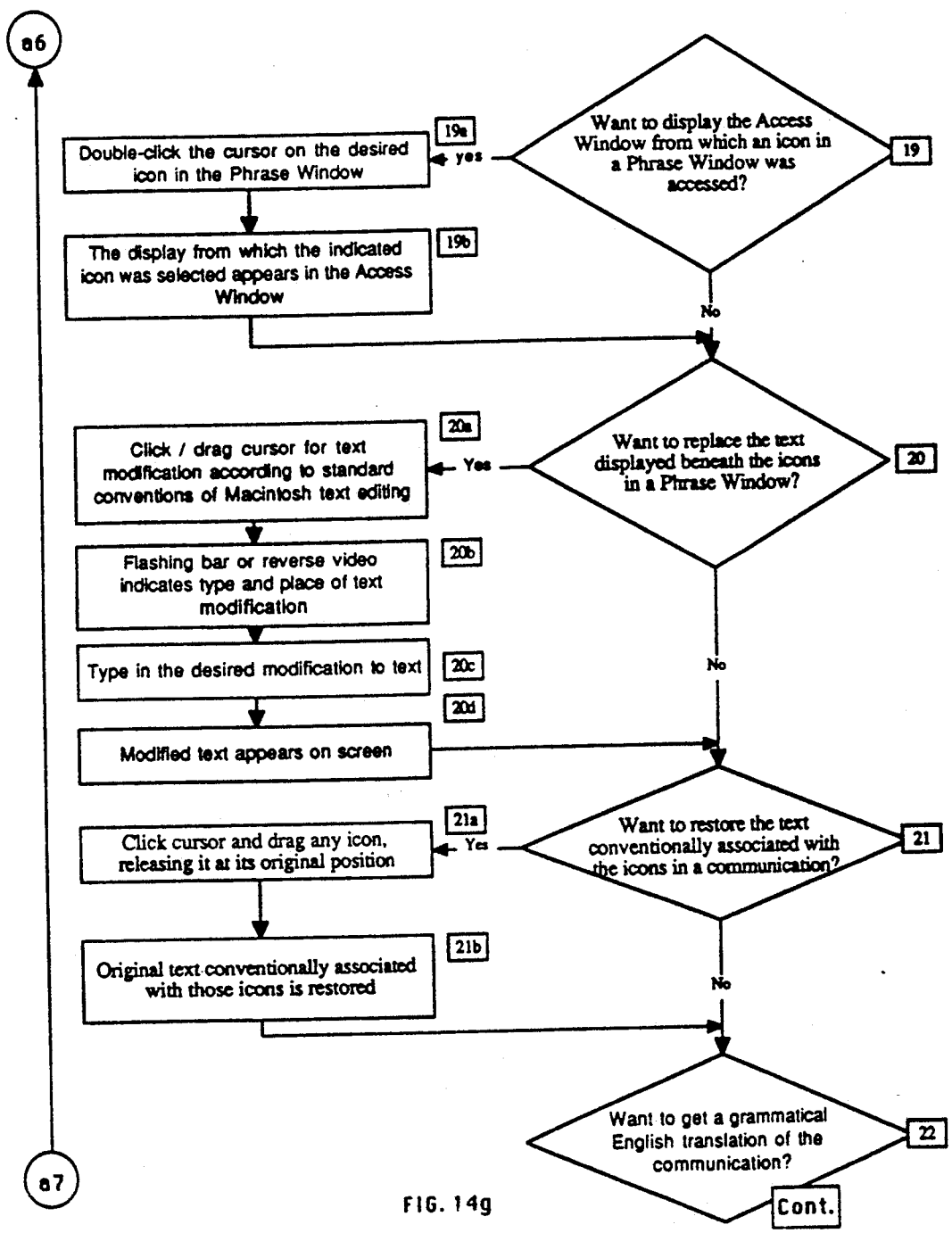
Figure 14H:
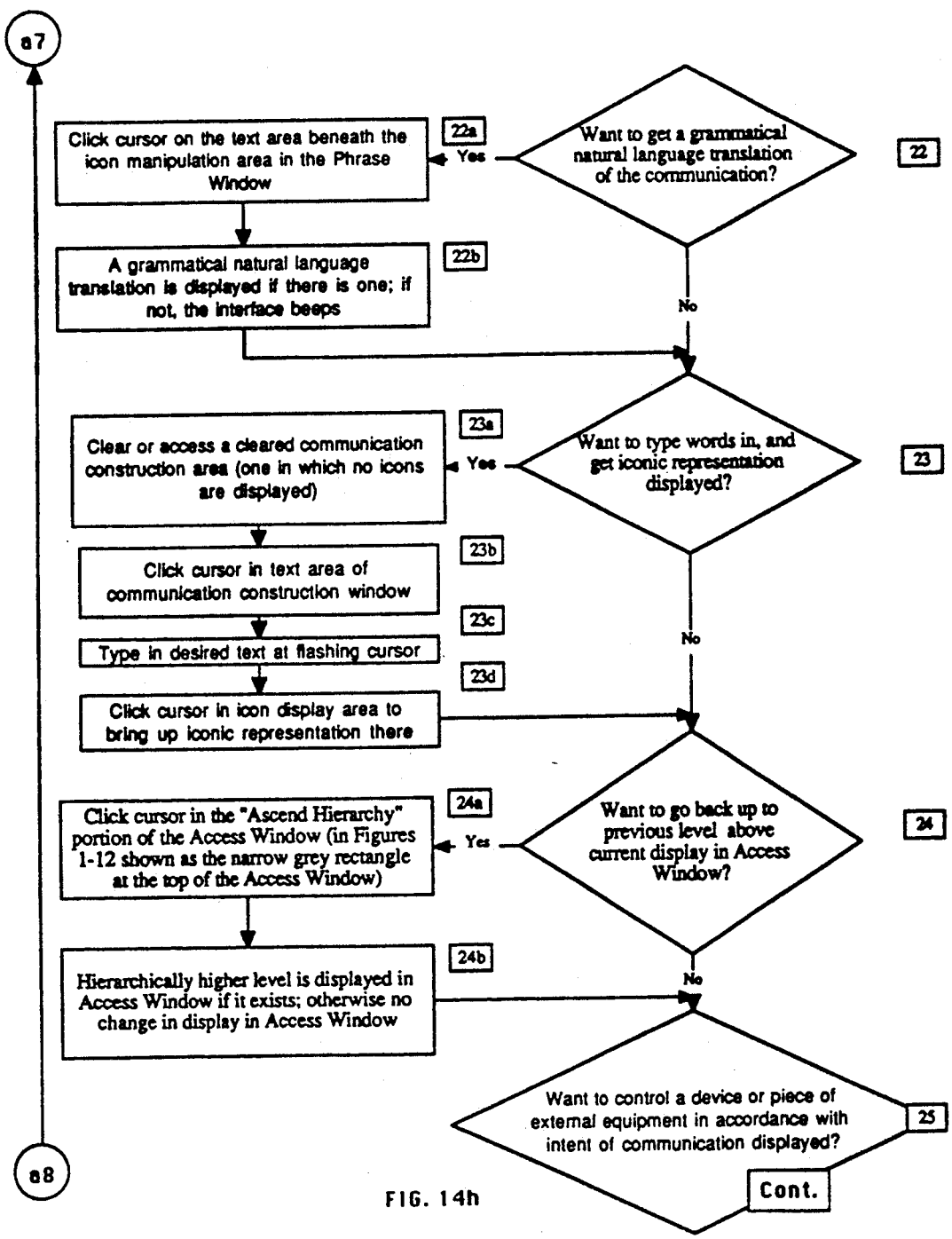
Figure 14I:
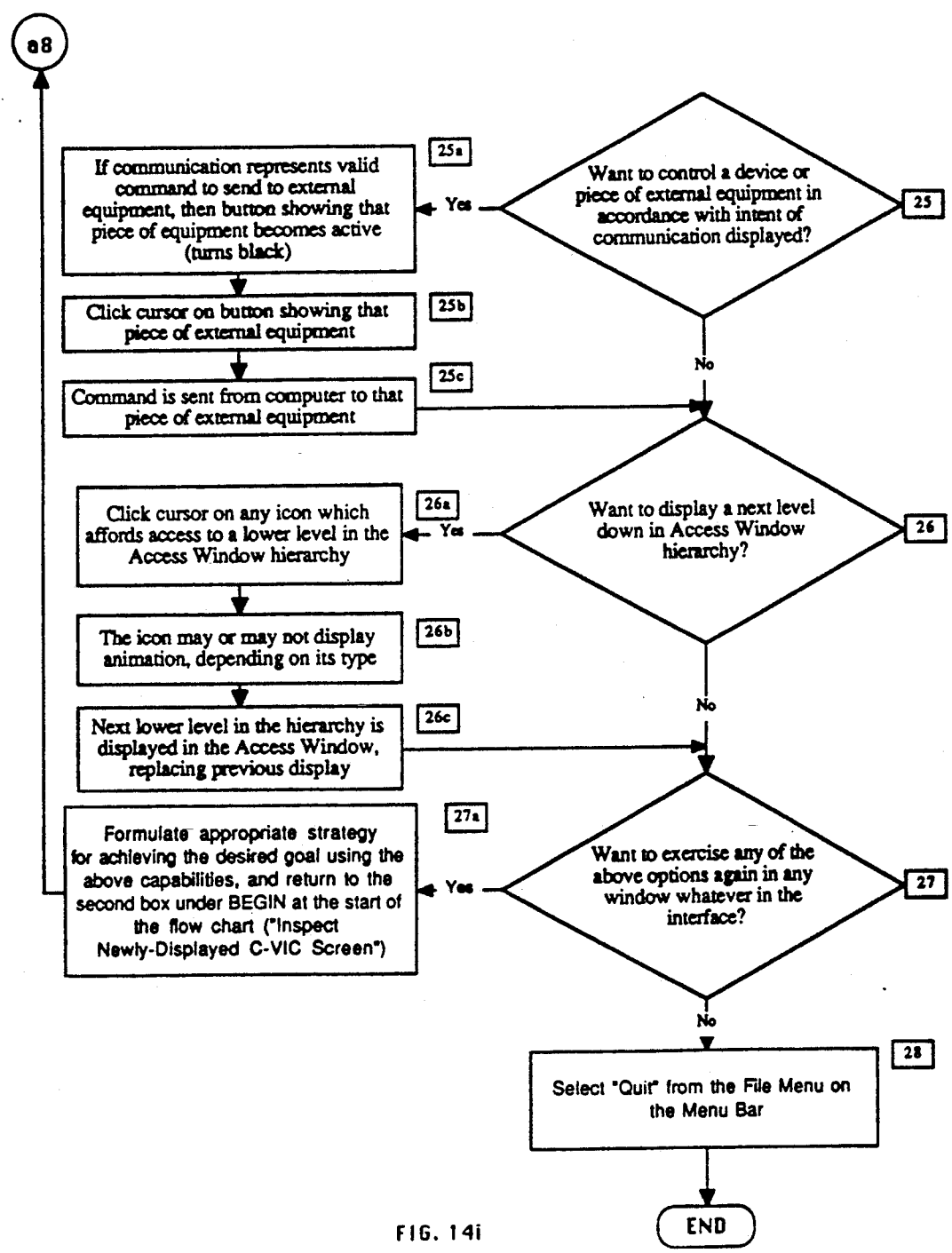

FIG. 13k shows the iconic phrase of [CHEF] [STIR(S)] [SAUCEPAN] [NON-STOP] [TEN] [MINUTES], to mean "The chef stirs the saucepan non-stop ten minutes." A control icon is shown and when clicked shows a timer ringing. The presence of the control icon serves to prompt the user to set the timer for ten minutes since, logically, if its ringing is to signal the passage of the specified amount of time having been dedicated to the indicated task, it will have to be set at the outset of performing the task. Aphasic users are capable of this sort of "backwards" reasoning. Other potential users, such as mentally retarded individuals may have to be guided using smaller and more explicit steps, which do not require them to draw inferences such as these.

FIG. 13l shows the final iconic phrase of [PEOPLE] [EAT] [RICE], to mean "The people eat the rice". The completion of the recipe is indicated by two means. First the control icon of the notebook is replaced by a smiling face, suggesting satisfaction of conditions as well as persons. Secondly, the smiling face is inert so that clicking of it does not cause any event to occur. In addition, it cannot be dragged to any of the other windows. Thus, it communicates that activity has reached an end, and nothing remains to be done. In general, icons throughout communicate using a combination of cognitive and technical means.

As can be seen from the foregoing, the method of the present invention by using a computer and a display and a pointing device facilitates the communication process and permits the communication process to be an interactive one. Unlike the flash card method of the prior art and as implemented in a computerized flash card system, the methods of the present invention permit the computer through its processing capability to interactively communicate and provide a number of forms of illustrative and corroborative information regarding icons, their combinations and their use, in specified situations, with the user who may or may not be aphasic. Further, through much experimentation, it has been determined that displays in these certain manners afford the clearest and most reliable indications of meaning in the communication process.

What is claimed is:

1. A method of communicating language oriented information to and form a user, by the use of a computer with a display having a pointing device for visually indicating a position, through a cursor means, on the display, said method comprising the steps of:
    (a) generating an image, which is a graphical representation of the language oriented information, by the computer;
    (b) displaying said image generated on the display;
    (c) generating a plurality of icons, by the computer; each of said icons is a graphical representation of an action to extract a type of language information;
    (d) displaying said plurality of icons on the display with said image displayed in step (b);
    (e) moving the cursor means on the display, by the user, through the use of the pointing device to a desired one of said plurality of icons;
    (g) selecting one of said plurality of icons by the user;
    (g) transforming the cursor means to the image of the icon selected, by the computer in response to the user selection;
    (h) moving said icon selected image of the cursor means to said image, by the user;
    (i) activating on said image by said icon selected image of the cursor means, by the user; and
    (j) displaying information represented by said image acted upon by the icon selected image of the cursor means, by the computer.

2. The method of claim 1 wherein said selecting step (f) comprises, activating the pointing device.

3. The method of claim 1 wherein the information displayed in step (j) is an animation.

4. A method of communicating language oriented information in a communication session, to and from an aphasic user, by the use of a computer with a display having a pointing device for visually indicating a position, through a cursor means, on the display, said method comprising the steps of:
    (a) generating a plurality of original images; which collectively represent prestored language information, appropriate for the communication session, by the computer;
    (b) displaying said original images generated on the display;
    (c) generating a plurality of replacement images for at least one of said display original images in response to the aphasic user activating the cursor means through the use of the points, device on the one displayed original image, by said computer; each of said plurality of replacement images represents options for the one displayed original image; and
    (d) displaying said plurality of replacement images atop on the display of said one displayed original image.

5. The method of claim 4 further comprising the step of:
    (e) moving the cursor means, by the user to one of said replacement images; and
    (f) activating said one of said replacement images, by the user, to replace the one displayed original image, to form a replaced image.

6. The method of claim 5 further comprising the steps of:
    (g) responding to said activation, by said computer, by generating a text language associated with said plurality of original images having at least one replaced image; and
    (h) displaying said generated text language.

7. A method of communicating language oriented information in a communication session, to and from an aphasic user, by the user of a computer with a display having a pointing device for visually indicating a position, through a cursor means, on the display, said method comprising the steps of:
    (a) generating a plurality of original images; which collectively represent prestored language information, appropriate for the communication session, by the computer;
    (b) displaying said original images generated on the display;
    (c) generating a plurality of replacement images for at least one of said displaced original images, by said computer; each of said plurality of replacement images represents options for the associated one of the displayed original image;

(d) moving the cursor means on the display by the aphasic user, through the use of the pointing device to a desired one of said plurality of original images;

(e) selecting one of said plurality of original images, by the user; and (f) displaying said plurality of replacement images in placed of said selected original image.

8. The method of claim 7 further comprising the steps of:

(g) moving the cursor means, by said user to one of said replacement images; and (h) activating said one of said replacement images, by said user, to use said replacement image in the communication session.

9. The method of claim 8 further comprising the steps of:

(i) responding to said activation, by said computer, by generating the test language associated with said plurality of original images having at least one replaced image; and (j) displaying said generated text language.

10. A method of communicating language oriented information in a communicating session, to and from an aphasic user, by the use of a computer with a display having a pointing device for visually indicating a position, through a cursor means, on the display, said method comprising the steps of:

(a) generating a first phrase of a plurality of images; which collectively represent a set of sequence of pre-stored language information, appropriate for the communication session, by the computer;

(b) displaying said first phrase images on the display, by said computer;

(c) displaying a control icon is proximity to said first phrase images by said computer;

(d) activating said control icon through the cursor means by the aphasic user through the use of the pointing device;

(e) displaying a second phrase of a plurality of images, which is the sequential images to said first phrase images, in response to the aphasic user activating said control icon, by said computer; and (f) repeating the steps of (d) through (e).

11. A method of communicating language oriented information from a first user, having language capability, to an aphasic user, by the use of a computer with a display, and an input means, said method comprising the steps of:

(a) inputting textual language by the first user into the computer;

(d) converting said textual language by the computer into at least one icon, which is the graphical representation of the inputted textual language; and (c) displaying said icon on the display to the aphasic user for communicating language information between said first user and said aphasic user.

12. A method of communicating language oriented information to and from a user, by the use of a computer with a display having a pointing device for visually indicating a position through a cursor means, on the display, said method comprising the steps of:

(a) generating a plurality of images which collectively represent language information appropriate for the communication session, by the computer;

(b) displaying said images generated on the display;

(c) moving the cursor means, by the user through the use of the pointing devices to one of said plurality of images;

(d) activating said one image, by the user;

(e) responding to said activation, by the computer, by generating an explanatory display, said explanatory display being dependent on the part-of-speech of the word associated with said one image activated, wherein if said word is;

(i) a noun, said explanatory display being other images of nouns mounted on a facet of a solid geometric body, rotated to display images of other nouns;

(ii) a verb, said explanatory display being an image depicting only essentials of the action represented by the verb, and not the particular features of any identifiable word associated with the verb;

(iii) an adjective, said explanatory display being an image visually depicting a noun ranged through a plurality of values and then settling on an appropriate value depicted by the adjective;

(iv) a preposition, said explanatory image being extended to the side of said plurality of images to direct attention specifically to the nouns entering into the preposition al relationship; and (v) a conjunction, said explanatory display being expanded to indicate neighboring key images conjoined and visually denoting the nature of the intended relationship.

13. A method of communicating language oriented information to and from a user, by the use of a computer with a display having a pointing device for visually indicating a position, through a cursor means, on the display, said method comprising the steps of:

(a) generating a plurality of images, which collectively represent language information appropriate for the communication session by the computer;

(b) displaying said images generated on the display;

(c) moving the cursor means, by the user through the use of the pointing devices to a position adjacent to one of said images;

(d) activating the cursor means and, while activated, dragging the cursor means to select at least two of said images which are adjacent to one another;

(e) responding to said activation, by the computer, by combining semantically appropriate images into a single unified image; and (f) displaying said combined unified image.

14. The method of claim 13 wherein said images are an image of a noun followed by an image of a verb and wherein the responding step (e) further comprising displaying a single unified image on a facet of a rotatable solid geometric body, of the image of the noun as a subject performing the image of the verb as a predicate, with alternative images of the verb being acted upon by the image of the noun displayed on other facts of the body.

15. The method of claim 13 wherein said images are an image of an adjective followed by an image of a noun and wherein the responding step (e) further comprising display a single unified image with a control and having the quality depicted by the adjective being adjustable by the user.

16. A method of communicating language oriented information to and from a user, by the use of a computer with a display having a pointing device for visually indicating a position, through a cursor means, on the display, said method comprising the steps of:

(a) generating a plurality of images, which collectively represent language oriented information appropriate for the communication session, by the computer;

(b) displaying said first images generated on the display;

(c) moving the cursor means, by the user through the use of the pointing device to a position adjacent to one of the images;

(d) activating the cursor means and, while activated, dragging the cursor means in a substantially vertical direction, crossing said activated one image to the other side of said one image;

(e) responding to said activation, by the computer, by displaying in another portion of the display, and activated a plurality of replacement images displayed in a vertical direction atop said activated one image;

(f) moving the cursor means, by the user to one of the replacement images displayed in said another portion of the display;

(g) selecting and activating one of said replacement images displayed in said another portion of the display; and (h) displaying only the selected one of the images in the position previously occupied by said activated one image activated by the user per step (d).

* * * * *